(12) United States Patent
Thompson et al.

(10) Patent No.: US 12,187,382 B2
(45) Date of Patent: Jan. 7, 2025

(54) DRIVE TRAIN COMPONENTS FOR RECREATIONAL VEHICLES

(71) Applicant: Arctic Cat Inc., Thief River Falls, MN (US)

(72) Inventors: Kevin David Thompson, Mentor, MN (US); Gary D. Homme, Newfolden, MN (US); Devin Joseph Danielson, St. Cloud, MN (US); Andrew Jon Ellsworth, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/379,316

(22) Filed: Oct. 12, 2023

(65) Prior Publication Data

US 2024/0034434 A1 Feb. 1, 2024

Related U.S. Application Data

(60) Continuation of application No. 17/141,521, filed on Jan. 5, 2021, now Pat. No. 11,878,765, which is a
(Continued)

(51) Int. Cl.
*B62M 27/02* (2006.01)
*B62D 55/07* (2006.01)
(Continued)

(52) U.S. Cl.
CPC .............. *B62M 27/02* (2013.01); *B62D 55/07* (2013.01); *B62D 55/12* (2013.01); *B62D 55/14* (2013.01);
(Continued)

(58) Field of Classification Search
CPC ........ B62D 55/07; B62D 55/12; B62D 55/14; B62M 27/02; B62M 2027/023;
(Continued)

(56) References Cited

U.S. PATENT DOCUMENTS 3,939,720 A 2/1976 Aaen et al.
4,664,644 A 5/1987 Kumata et al.
(Continued)

OTHER PUBLICATIONS

Arctic Cat 2017, The Thunder Returns, On Snow Magazine, vol. 6, Issue 5, 60-67, May 11, 2016.
(Continued)

*Primary Examiner* — Tony H Winner
*Assistant Examiner* — Felicia L. Brittman-Alabi
(74) *Attorney, Agent, or Firm* — Billion & Armitage

(57) ABSTRACT

Embodiments of the present disclosure describe a snowmobile including an engine mounted on the chassis, a drive track in contact with the chassis, and a drive train, operatively interconnecting the engine with the drive track for delivering propulsive power to the drive track. The drive train includes a driveshaft, comprising a tubular driveshaft including two or more interior channels, the channels positioned in a substantially longitudinal orientation, two or more sprocket driving features on an exterior surface of the tubular driveshaft, and one or more fitting components, positioned at one or more distal ends of the driveshaft.

20 Claims, 24 Drawing Sheets

Related U.S. Application Data division of application No. 15/834,704, filed on Dec. 7, 2017, now Pat. No. 10,913,512.

(60) Provisional application No. 62/431,230, filed on Dec. 7, 2016.

(51) Int. Cl.
  *B62D 55/12* (2006.01)
  *B62D 55/14* (2006.01)
  *F16C 3/02* (2006.01)

(52) U.S. Cl.
  CPC ......... *F16C 3/02* (2013.01); *B62M 2027/023* (2013.01); *B62M 2027/027* (2013.01); *B62M 2027/028* (2013.01); *F16C 3/026* (2013.01)

(58) Field of Classification Search
  CPC ......... B62M 2027/27; B62M 2027/028; F16C 3/02; F16C 3/026; F16C 2326/06
  USPC ........................................... 180/190
  See application file for complete search history.

(56) References Cited

U.S. PATENT DOCUMENTS

| | | |
|---|---|---|
| 4,834,693 A | 5/1989 | Profant et al. |
| 5,320,580 A | 6/1994 | Simon |
| 5,672,286 A | 9/1997 | Seeds |
| 5,857,916 A | 1/1999 | Schoch et al. |
| 5,904,622 A | 5/1999 | Breese et al. |
| 6,149,540 A | 11/2000 | Johnson et al. |
| 6,811,504 B2 | 11/2004 | Korenjak et al. |
| 6,959,476 B2 | 11/2005 | Li et al. |
| 7,044,872 B1 | 5/2006 | Johnson |
| 7,063,639 B2 | 6/2006 | Schoenfelder et al. |
| 8,919,477 B2 * | 12/2014 | Conn .................... B62K 19/22 180/9.62 |
| 9,057,432 B1 | 6/2015 | Bouffard et al. |
| 2002/0033295 A1 | 3/2002 | Korenjak et al. |
| 2002/0123400 A1 | 9/2002 | Younggren et al. |
| 2004/0048095 A1 | 3/2004 | Crocco et al. |
| 2006/0175108 A1 | 8/2006 | Kubota |
| 2008/0296078 A1 | 12/2008 | Capito |
| 2009/0183739 A1 | 7/2009 | Wondka |
| 2010/0311529 A1 | 12/2010 | Ochab et al. |
| 2016/0176284 A1 | 6/2016 | Nugteren et al. |
| 2018/0180141 A1 * | 6/2018 | Kuhl ................. F16H 61/66245 |

OTHER PUBLICATIONS

Non-Final Office Action Mailed on Oct. 5, 2023, Application No. 2,988,017, 9 Pages.

* cited by examiner

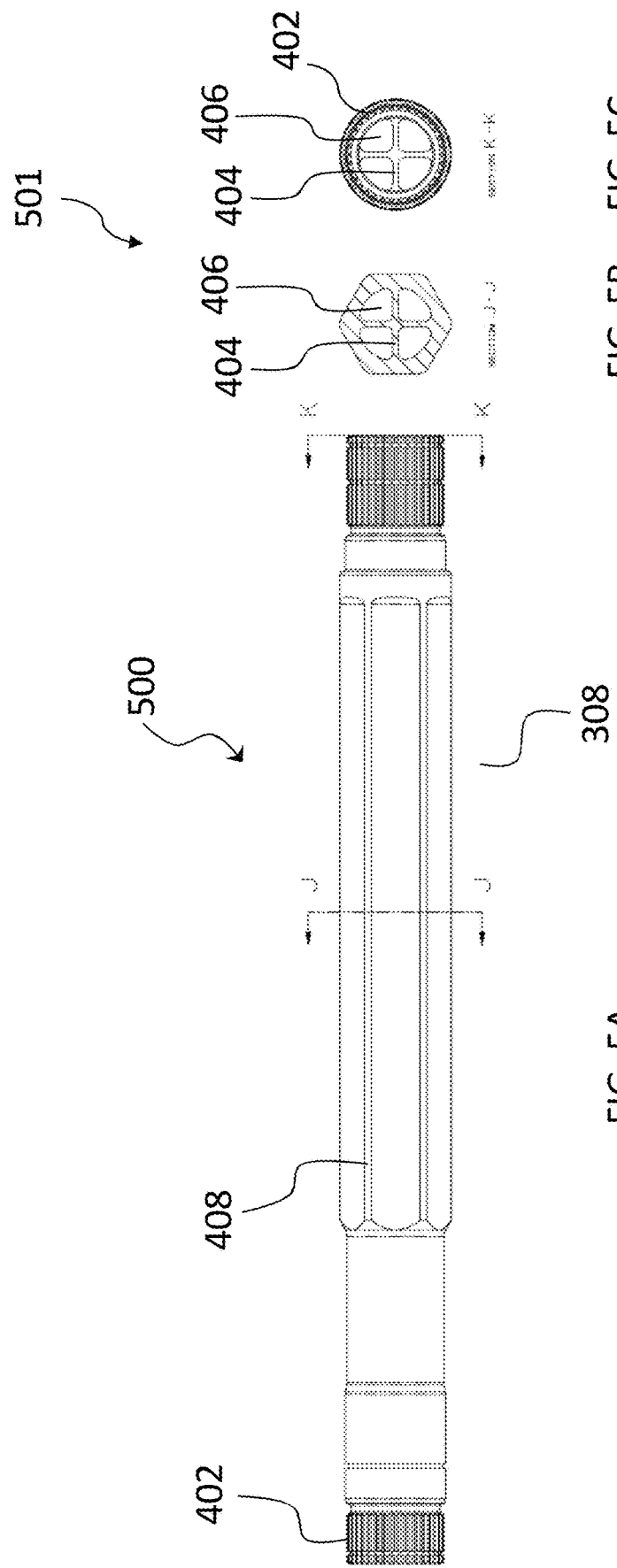

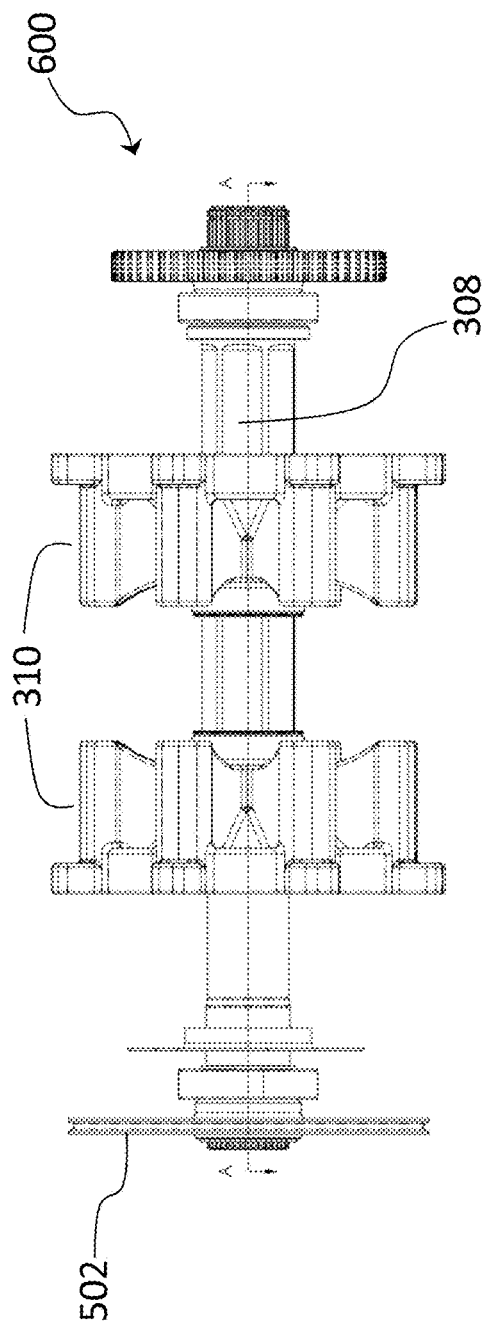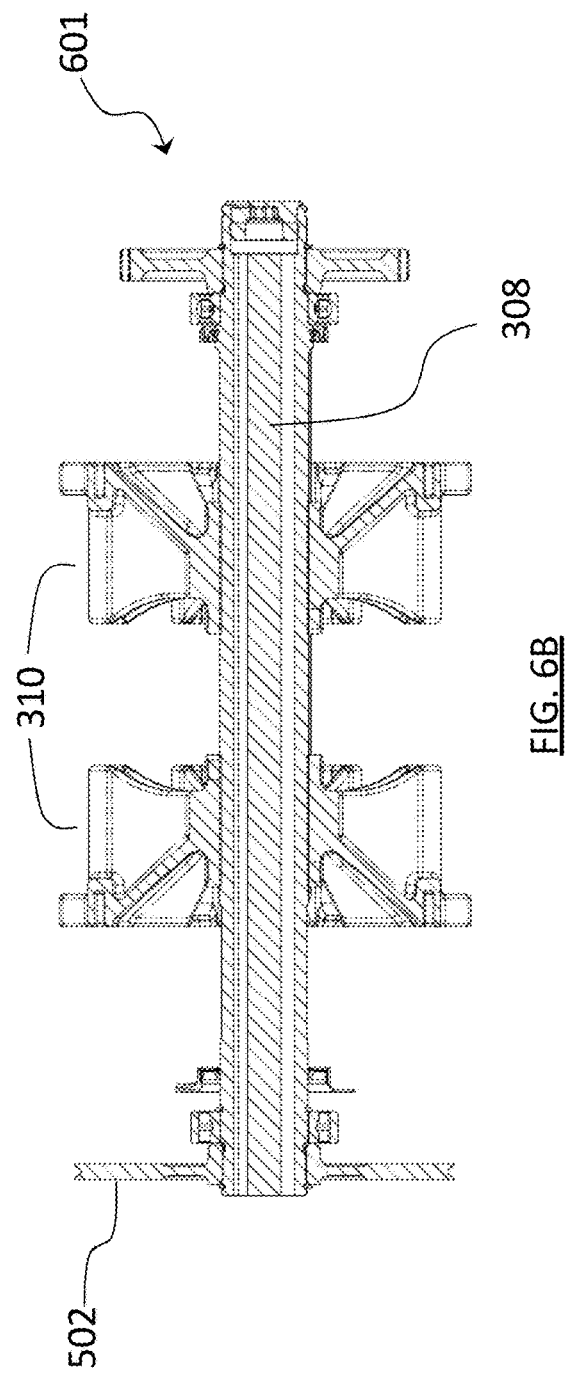
FIG. 6A
FIG. 6B

DRIVE TRAIN COMPONENTS FOR RECREATIONAL VEHICLES

This application is a continuation of U.S. application Ser. No. 17/141,521, filed on Jan. 5, 2021, which is a divisional of U.S. application Ser. No. 15/834,704 filed Dec. 7, 2017, now U.S. Pat. No. 10,913,512 granted Dec. 9, 2021, which claims the benefit of U.S. Provisional Application No. 62/431,230, filed on Dec. 7, 2016, and which applications are incorporated herein by reference. A claim of priority to all, to the extent appropriate, is made.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. The skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

At least some snowmobile frames include a tunnel and a front chassis portion which retains the power train, and a front suspension that mounts skis to the frame. A drive shaft is typically mounted to the front chassis portion and includes drive sprockets for powering a belt. A chain case, belt drive case, or gear box is also typically provided to transfer power from an engine or CVT (continuously variable transmission) to the drive shaft. A typical snowmobile may include a drivetrain with a drive shaft and an upper jack shaft that drives the drive sprocket(s) through the chain case, belt drive case, or gear box.

SUMMARY

Embodiments of the present disclosure describe a snowmobile including an engine mounted on the chassis, a drive track in contact with the chassis, and a drive train, operatively interconnecting the engine with the drive track for delivering propulsive power to the drive track. The drive train includes a driveshaft, comprising a tubular driveshaft including two or more interior channels, the channels positioned in a substantially longitudinal orientation, two or more sprocket driving features on an exterior surface of the tubular driveshaft, and one or more fitting components, positioned at one or more distal ends of the driveshaft.

Embodiments also describe a driveshaft, comprising a tubular driveshaft including two or more interior channels, the channels positioned in a substantially longitudinal orientation, two or more sprocket driving features on an exterior surface of the tubular driveshaft, and one or more fitting components, positioned at one or more distal ends of the driveshaft.

Embodiments describe a snowmobile, including an engine, mounted on a chassis, a drive track in contact with the chassis, and a drive train, operatively interconnecting the engine with the drive track for delivering propulsive power to the drive track. The drive train includes a rotatable input shaft connectable to an engine of a vehicle, a rotatable drive clutch connected to the input shaft, the drive clutch having a stationary sheave with an inner belt-engaging surface, a movable sheave with an inner belt-engaging surface, and a two-way roller bearing carried on the input shaft, the roller bearing having an outer belt-engaging surface. The snowmobile also includes a rotatable jack shaft connectable to a gear box, a rotatable driven clutch connected to the jack shaft, the driven clutch having a laterally stationary sheave with an inner belt-engaging surface, a laterally movable sheave with an inner belt-engaging surface, and an endless flexible drive belt disposed about the drive and driven clutches, the belt having an inner drive surface engageable with the outer surface of the roller bearing and a pair of side drive surfaces engageable against the inner belt-engaging surfaces of the sheaves, the size of the drive belt being selected so that when the engine is at an idle speed the inner surface of the belt firmly engages the outer surface of the roller bearing. The roller bearing is configured and arranged to permit the belt-engaging surface of the roller bearing to remain substantially stationary when the input shaft is rotating, thereby permitting the belt and driven clutch to remain substantially stationary when the engine is at an idle speed.

BRIEF DESCRIPTION OF DRAWINGS

This written disclosure describes illustrative embodiments that are non-limiting and non-exhaustive. Reference is made to illustrative embodiments that are depicted in the figures, in which:

FIGS. 6A, 6C-D illustrate perspective views 600 of a driveshaft and sprocket assembly, according to some embodiments.

FIG. 6B illustrates a cross-sectional view 601 of a driveshaft and sprocket assembly, according to some embodiments.

DETAILED DESCRIPTION

Embodiments of the present disclosure describe driveshaft manufactured at a lighter weight and less expense than previously used driveshafts. In snowmobile applications, reducing the weight of individual components, without sacrificing durability, function or utility, is an ongoing goal in product design. A lighter vehicle can increase performance and handling, among other characteristics. In the industry, driveshafts have been made of solid steel for simplicity and strength. In an effort to reduce the significant weight of solid steel driveshafts, the industry has attempted to hollow out a portion of the steel driveshaft, weld multimetal components to form a driveshaft, or glue lighter weight ends onto a steel shaft, among other examples. In such applications, the slightly decreased weight comes with an increase in cost, complexity and reliability. Embodiments of this disclosure describe a driveshaft that can be formed of a single, lightweight material (e.g., metal, metal alloy, composite, plastic, etc.) in a configuration that can reduce complexity, cost and/or weight, while maintaining function and durability. The driveshaft configuration can also reduce cost in machining and also by reducing overall part count.

In the past, snowmobiles were most often used in high performance, high speed applications. When using a CVT as part of a power train, this results in configurations in which the clutch is engaged at higher RPMs (rotations per minute) of the engine, so that a higher powerband is initiated at clutch engagement. In recent years, mountain sled riding and "boondocking" (riding slowly in deep snow) use has increased. In contrast to the typical snowmobile engagement, a power train configuration is herein disclosed in which CVT engagement is at a lower engine RPM and increased torque for such applications. This configuration is accomplished, at least in part, by the addition of a bearing assembly (such as a roller bearing) to the drive clutch, such that an inner belt rides on the bearing prior to clutch engagement. This configuration also allows for more consistent belt tensions and lessens or eliminates the need for a user to manually adjust driven clutch sheave spacing, affecting belt deflection and drive ratio.

Figure 1:
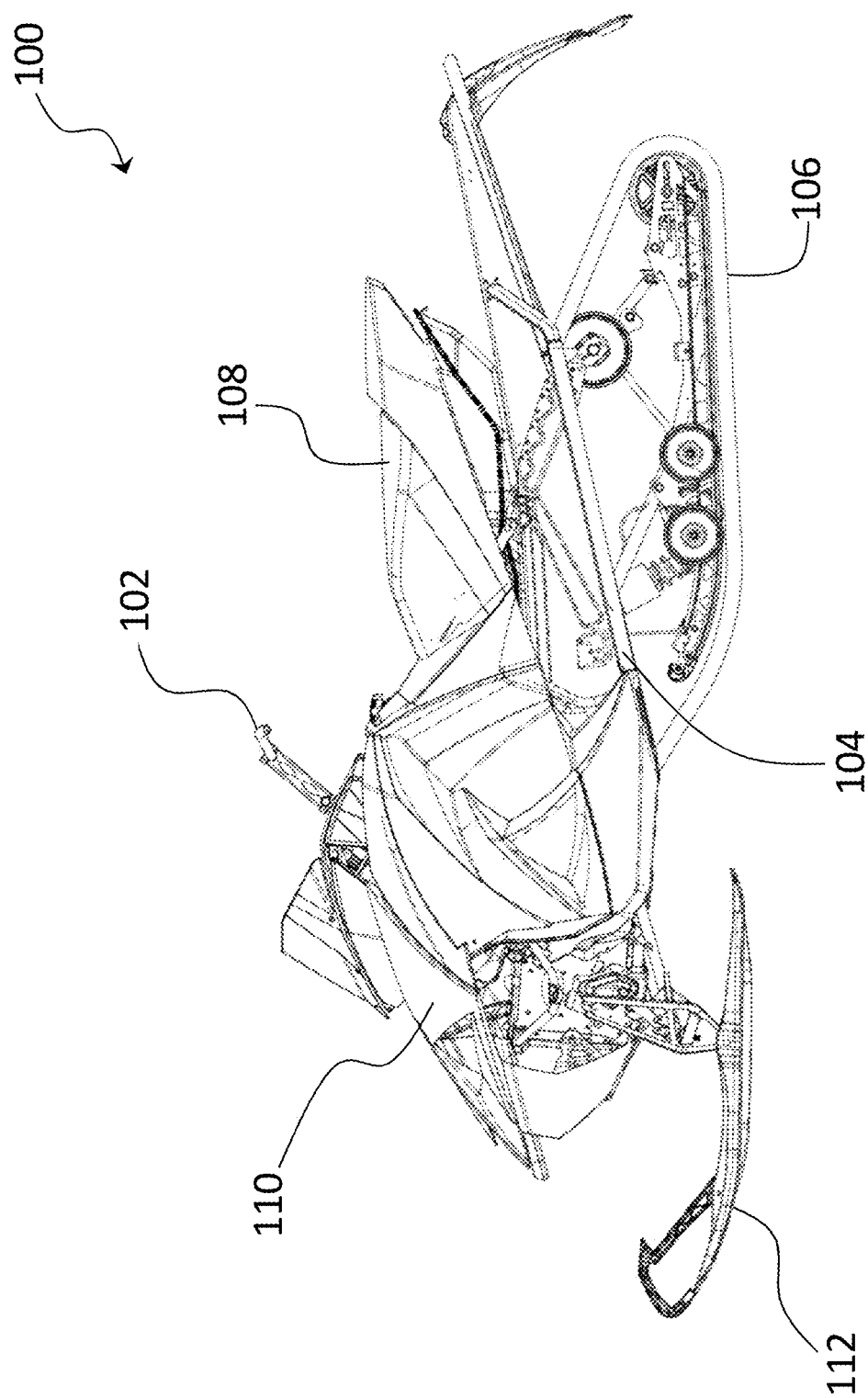
FIG. 1 illustrates a perspective view 100 of a snowmobile, according to some embodiments.
Figure 2A:
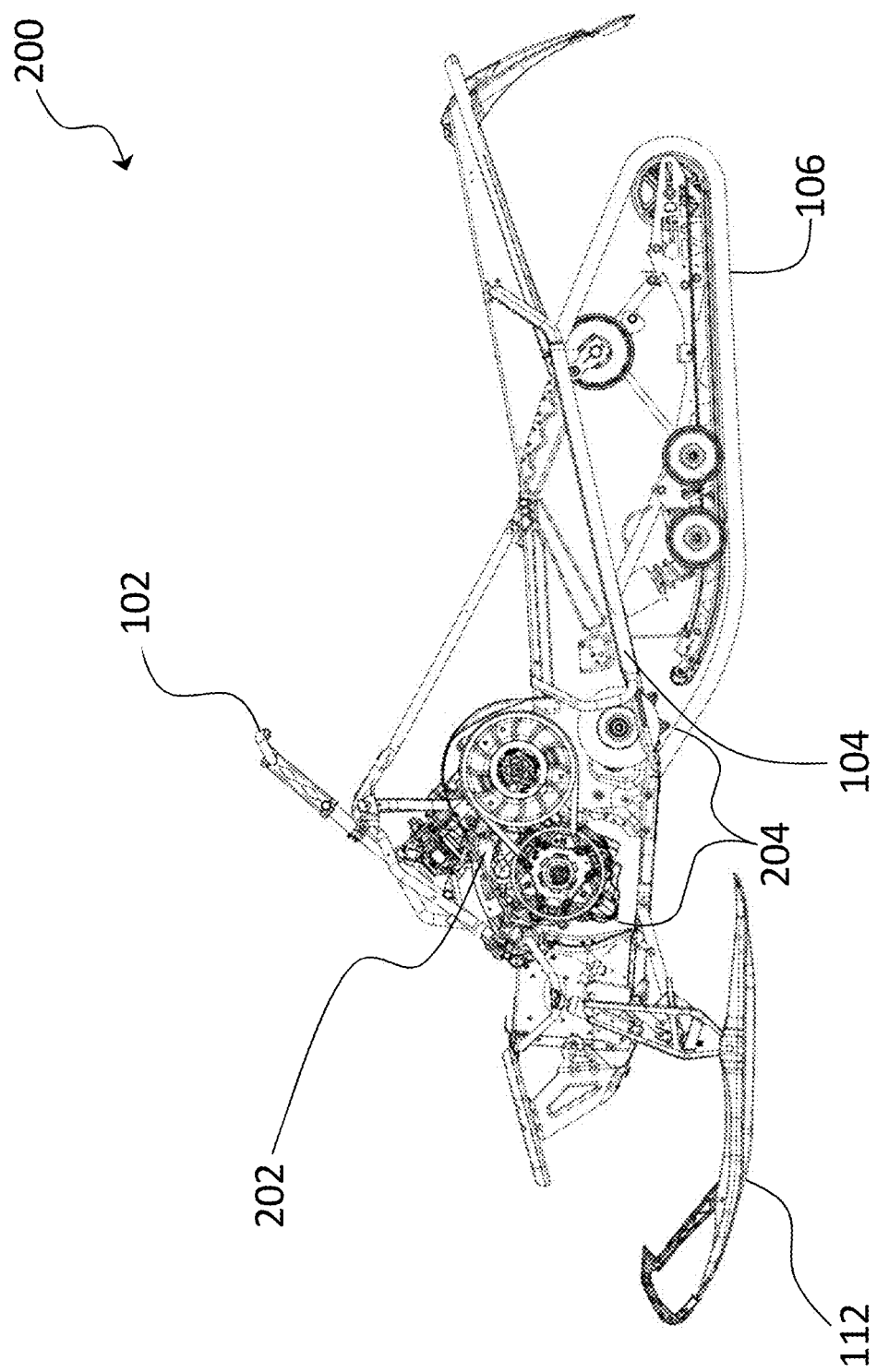
FIGS. 2A-B illustrate perspective views 200 of a snowmobile without a shroud and seat, according to some embodiments.
Figure 2B:
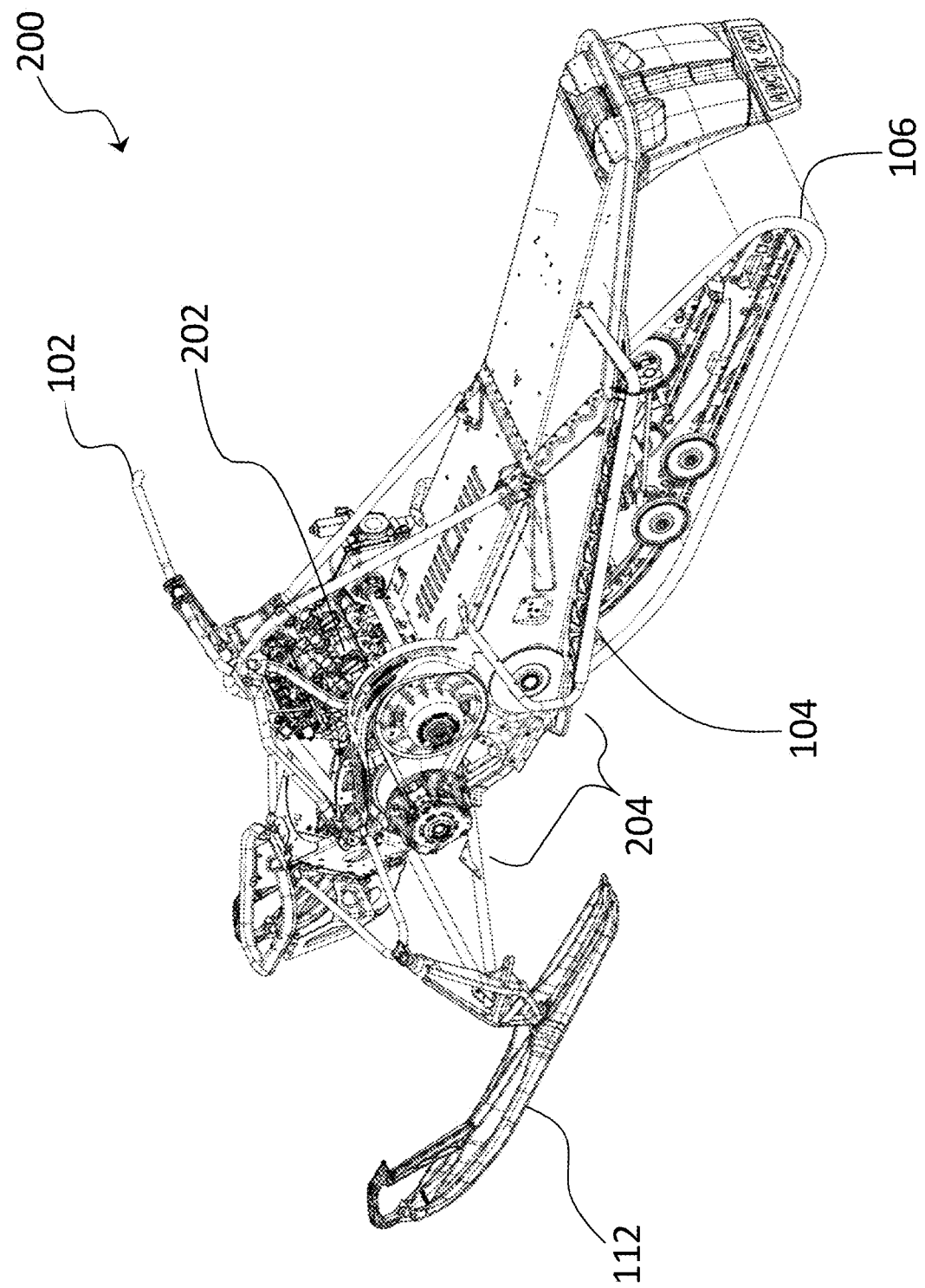
Figure 3A:
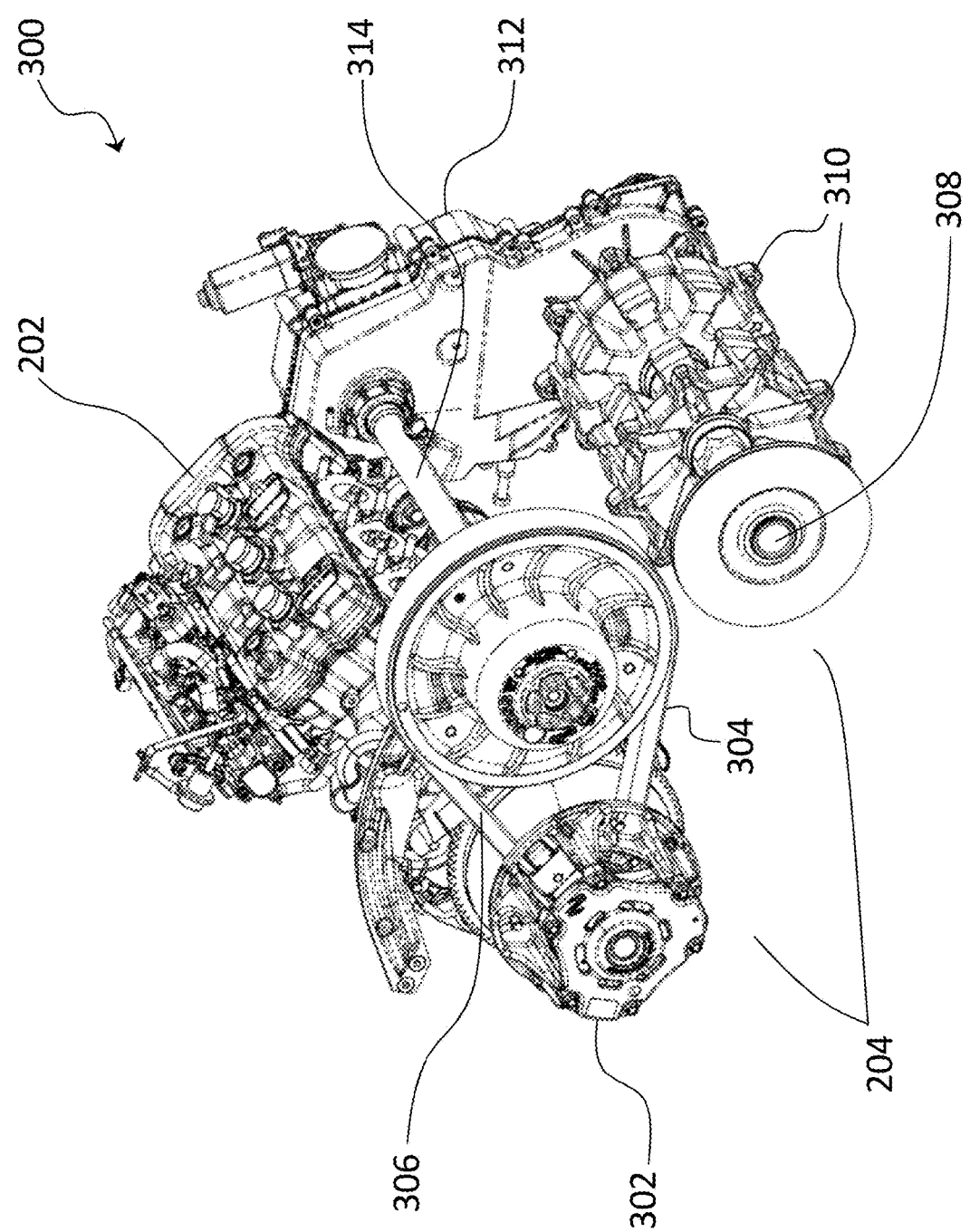
FIGS. 3A-D illustrate perspective views 300 of snowmobile engine and drive train components, according to some embodiments.
Figure 3B:
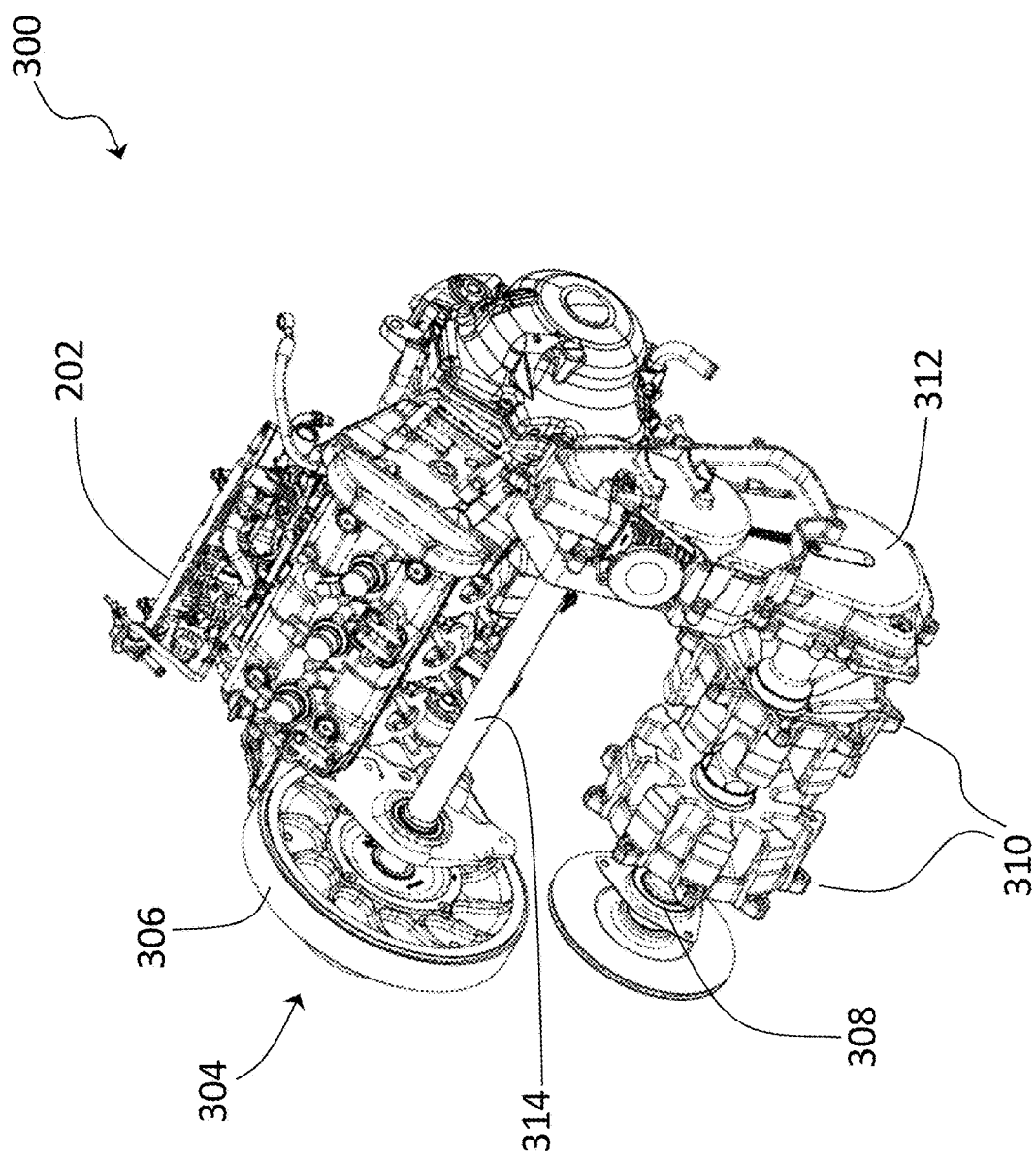
Figure 3C:
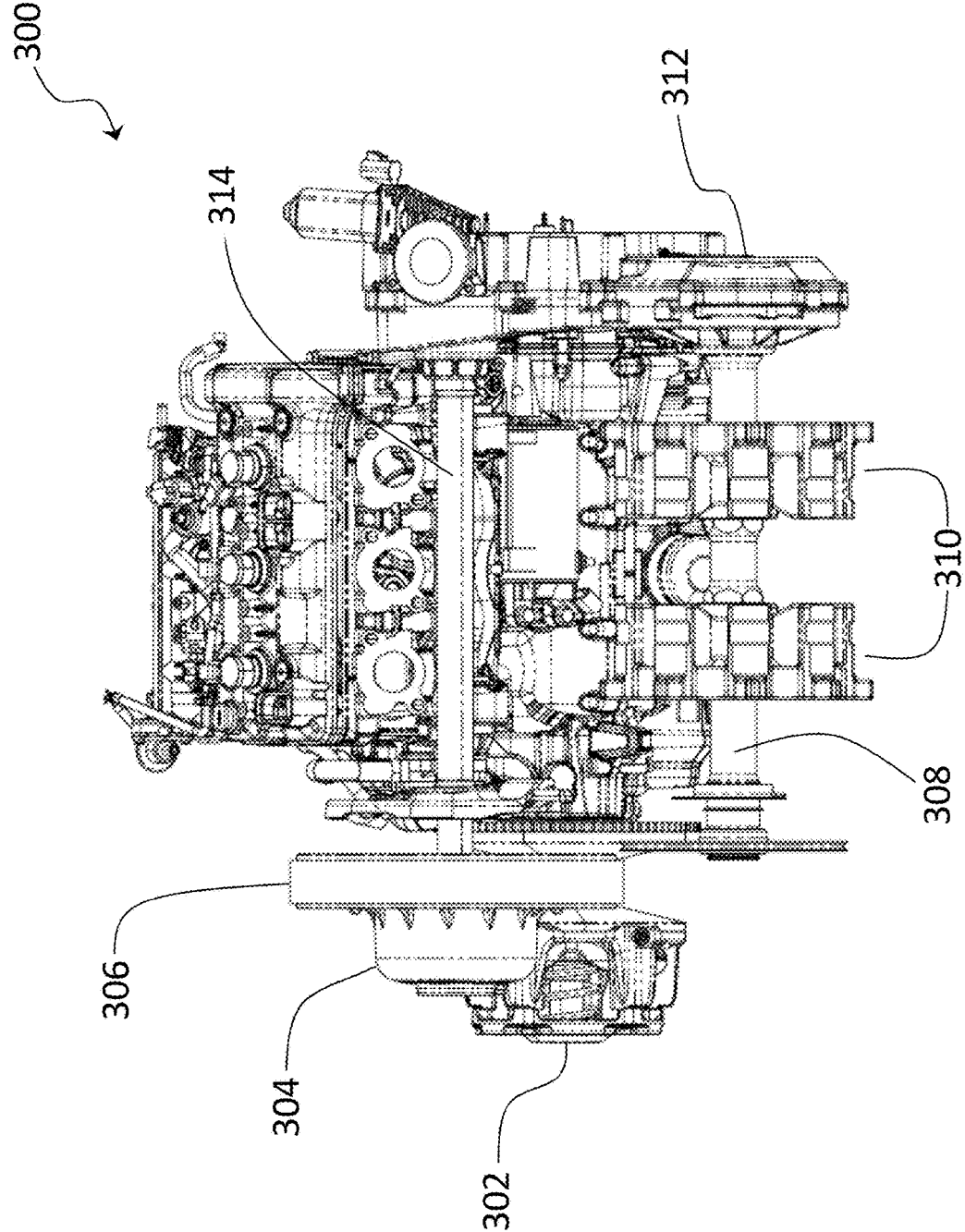
Figure 3D:
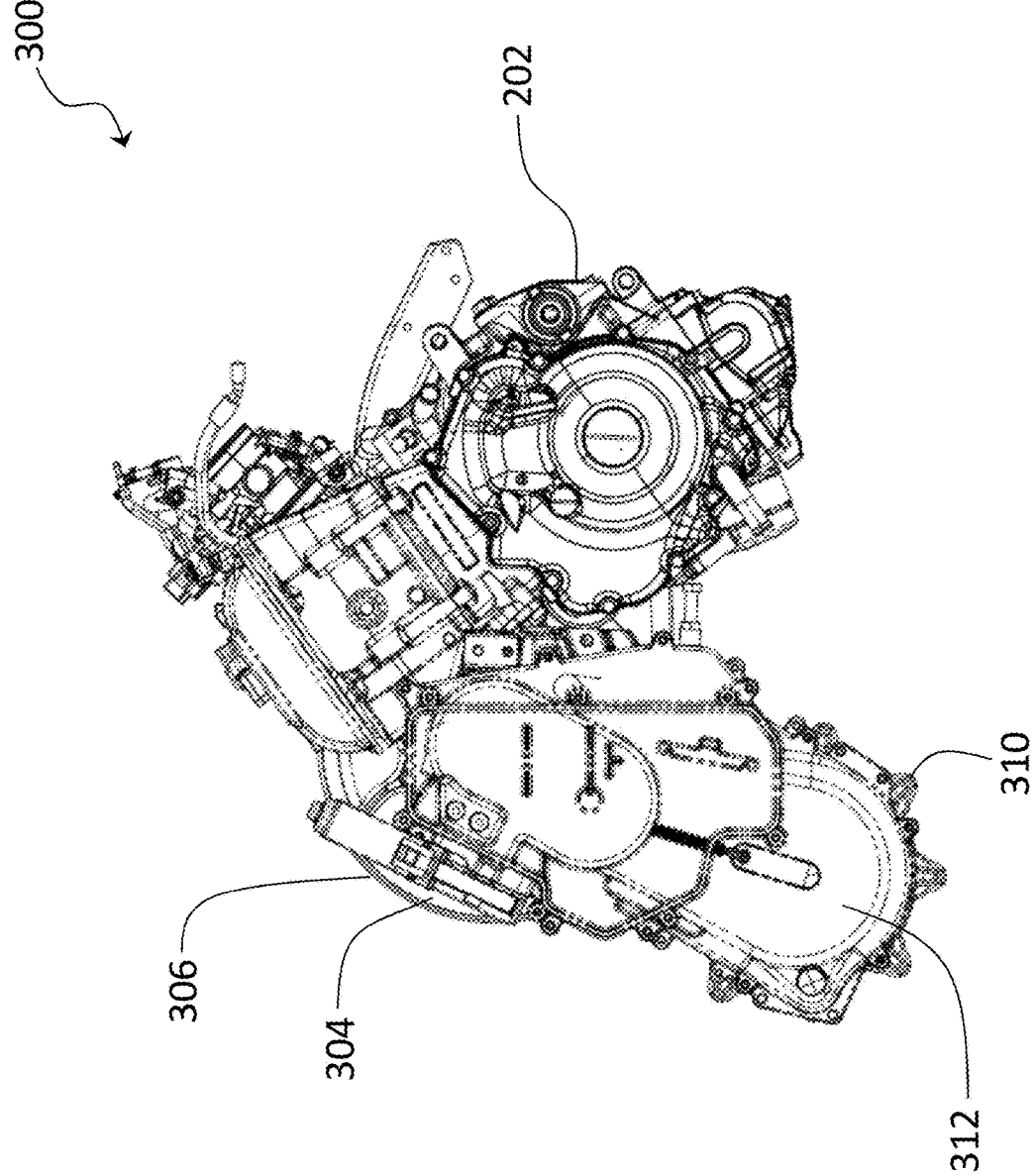

Referring to FIG. 1, a perspective view 100 of a snowmobile is shown, according to some embodiments. A chassis 104 or frame supports an engine (see FIG. 2A), drive or power train (see FIG. 2A), a drive track 106, handlebars 102 and skis 112. A shroud 110 or fairing in contact with the chassis covers and protects various components of the vehicle. A seat 108 is positioned rearward of the handlebars 102. With the shroud 110 and seat 108 removed (see FIGS. 2A-B), the engine 202 is shown in contact with a drive train 204. The drive train 204 includes a continuously variable transmission (CVT), for transferring power from the engine 202 to the drive track 106.

Figure 7A:
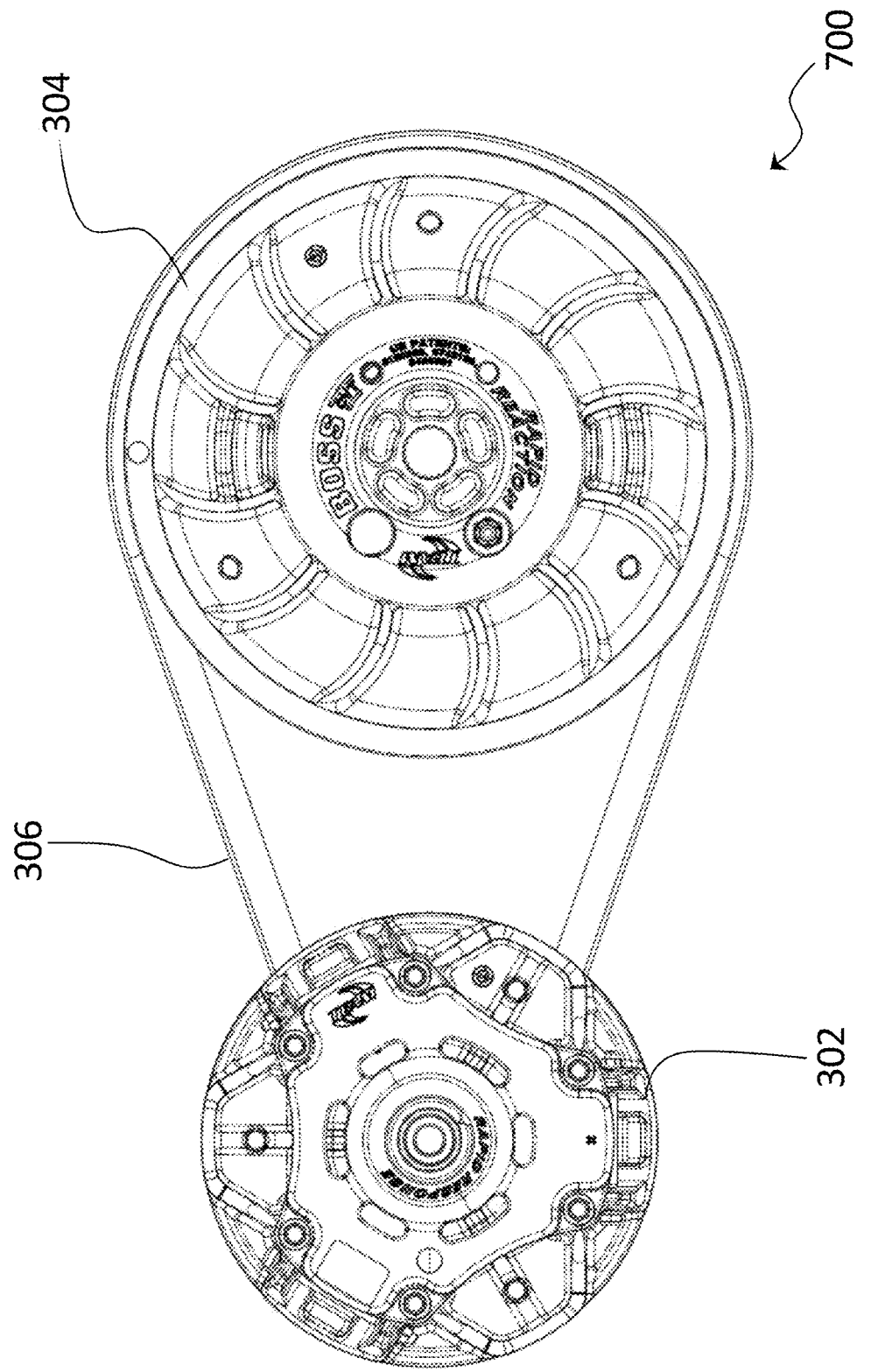
FIGS. 7A-E illustrate perspective views of drive train components, according to some embodiments.
Figure 7B:
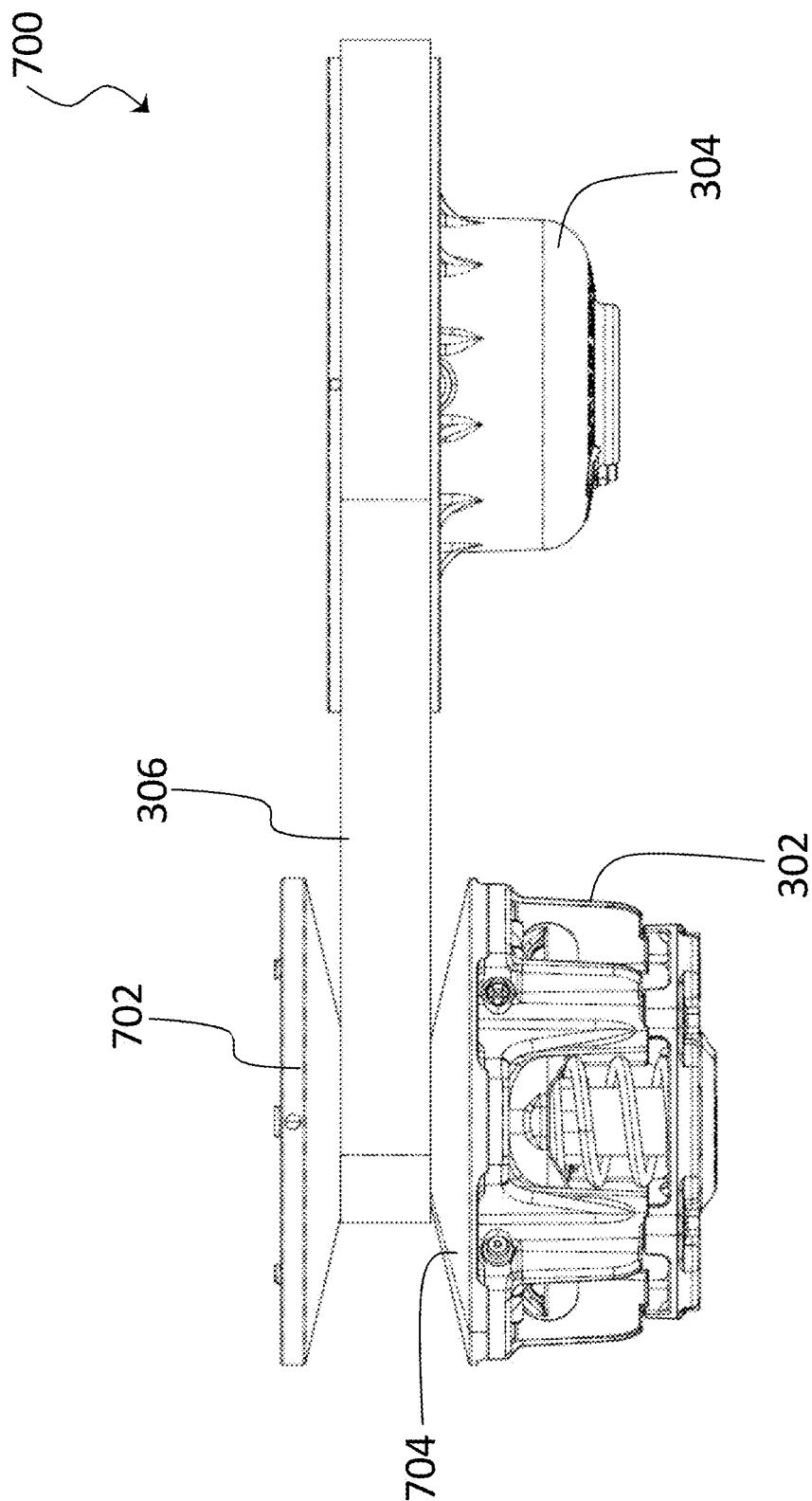
Figure 7C:
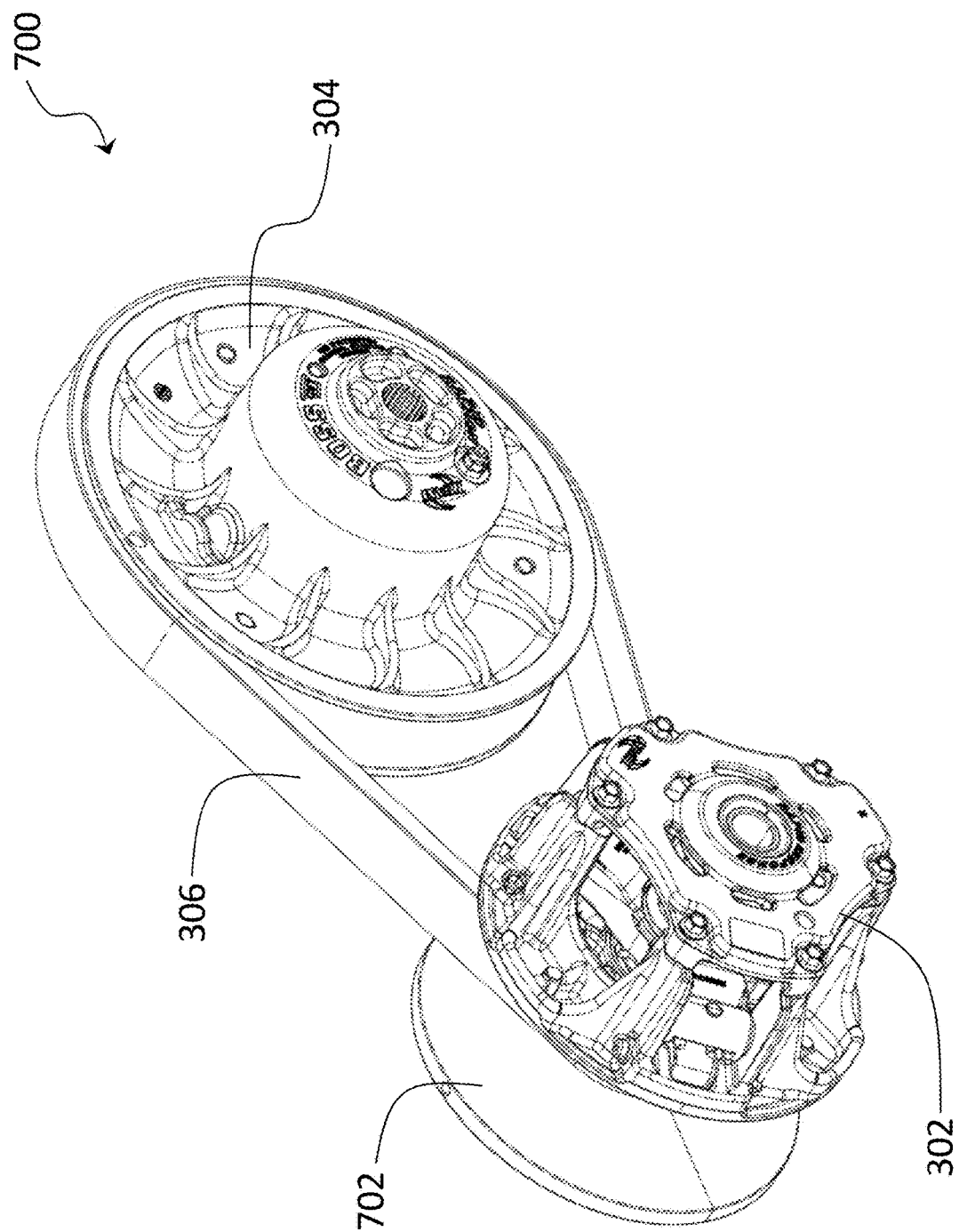

Referring to FIGS. 3A-D, perspective views 300 of snowmobile engine and drive train 204 components are shown, according to some embodiments. An engine 202 converts chemical energy to mechanical energy via a rotating input shaft (see 706 in FIG. 7F) in contact with a transmission or drive train 204, such as a CVT. The CVT includes a rotatable drive (or primary) clutch 302 connected to the input shaft (see also FIGS. 7A-D). The CVT also includes a rotatable driven (or secondary) clutch 304 connected to an output shaft or jack shaft 314, the driven clutch 302 having a laterally stationary sheave (see 702 in FIG. 7B, 7G) and a laterally movable sheave (see 704 in FIG. 7B) that is normally biased toward the stationary sheave 702. An endless flexible drive belt 306 is disposed about the drive 302 and driven clutches 304. Typically, the CVT transmission is connected to the output shaft 706 of the vehicle's engine, the transmission providing continuously variable gear reduction from the relatively higher rotation speed of the engine to the relatively lower rotation speed of the vehicle drive axle. A CVT may be used in conjunction with an additional gear box/transmission 312, if desired. For example, it may be desirable to provide a gear box 312 to permit the driver to shift between forward and reverse gears. In such cases, a neutral position may also be provided, along with, e.g., an optional low gear for extra power at low speeds. Typically, such a gear box 312 is connected to the jack shaft 314 of the CVT, the gear box 312 in turn having a drive shaft 308 connected by suitable linkages (sprockets 310, for example) to the drive track 106.

The endless, flexible, generally V-shaped drive belt 306 is disposed about the clutches 302, 304. Each of the clutches has a pair of complementary sheaves, one of the sheaves being laterally movable with respect to the other. The effective gear ratio of the transmission is determined by the positions of the movable sheaves in each of the clutches. The secondary driven clutch 304 has its sheaves normally biased together (e.g., by a torsion spring working in combination with a helix-type cam, as described below), so that when the engine is at idle speeds the drive belt rides near the outer perimeter of the driven clutch sheaves.

Figure 7E:
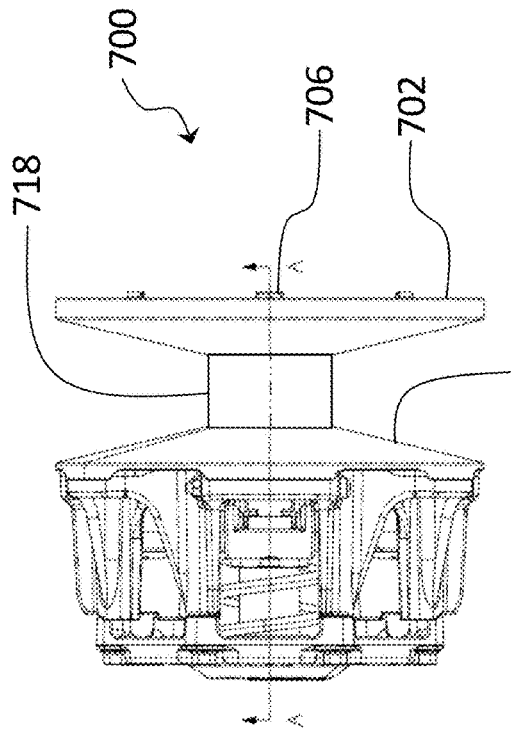
Figure 7D:
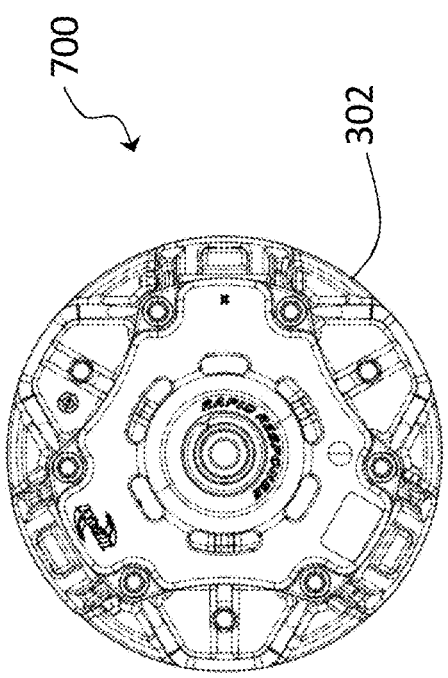
Figure 7F:
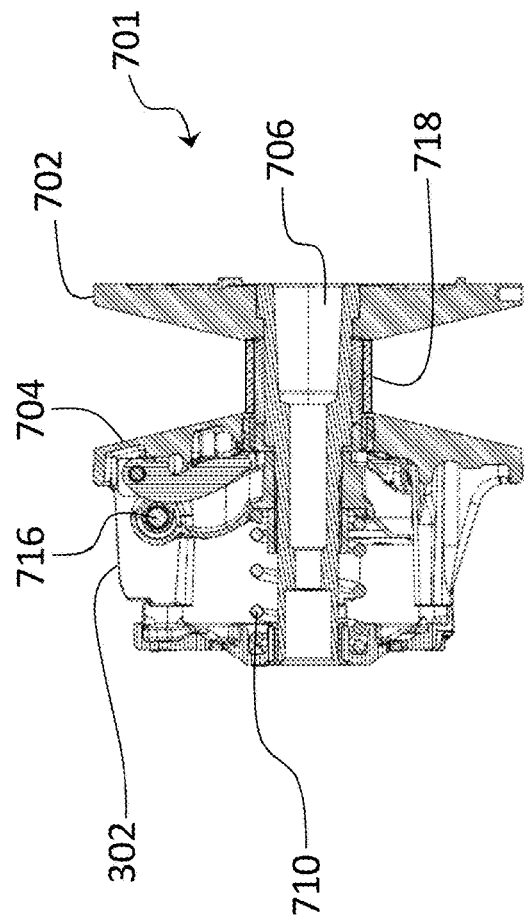
FIG. 7F illustrates a cross-sectional view 701 of drive train components, according to some embodiments.

The spacing of the sheaves in the primary drive clutch 302 usually is controlled by centrifugal flyweights (see 716 of FIG. 7F). As the drive clutch 302 rotates faster (in response to increased engine rpm) the flyweights 716 urge the movable sheave 704 toward the stationary sheave 702. This pinches the drive belt 306, causing the belt 306 to begin rotating with the drive clutch 302, the belt in turn causing the driven clutch 304 to begin to rotate. Further movement of the drive clutch's 302 movable sheave 704 toward the stationary sheave 702 forces the belt 306 to climb outwardly on the drive clutch sheaves, increasing the effective diameter of the drive belt path around the drive clutch 302. Thus, the spacing of the sheaves in the drive clutch 302 changes based on engine rpm. The clutch therefore can be said to be speed sensitive.

As the sheaves of the drive clutch 302 pinch the drive belt 306 and force the belt 306 to climb outwardly on the drive clutch sheaves, the belt 306 (not being stretchable) is pulled inwardly between the sheaves of the driven clutch 304, decreasing the effective diameter of the drive belt path around the driven clutch 304. This movement of the belt 306 inwardly and outwardly on the drive 302 and driven clutches 304 smoothly changes the effective gear ratio of the transmission in infinitely variable increments.

Figure 4A:
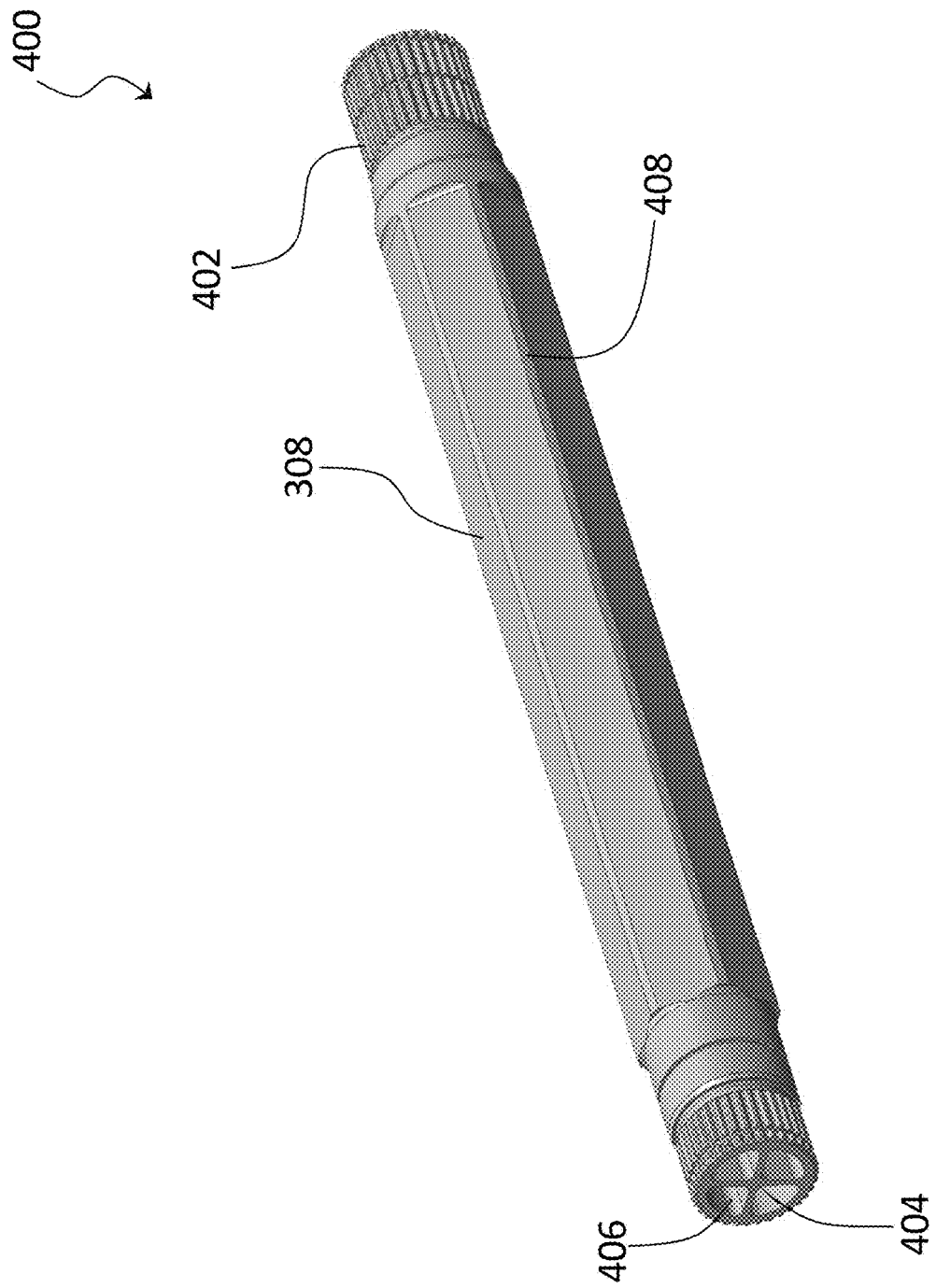
FIG. 4A illustrates a perspective view 400 of a driveshaft, according to some embodiments.
Figure 5D:
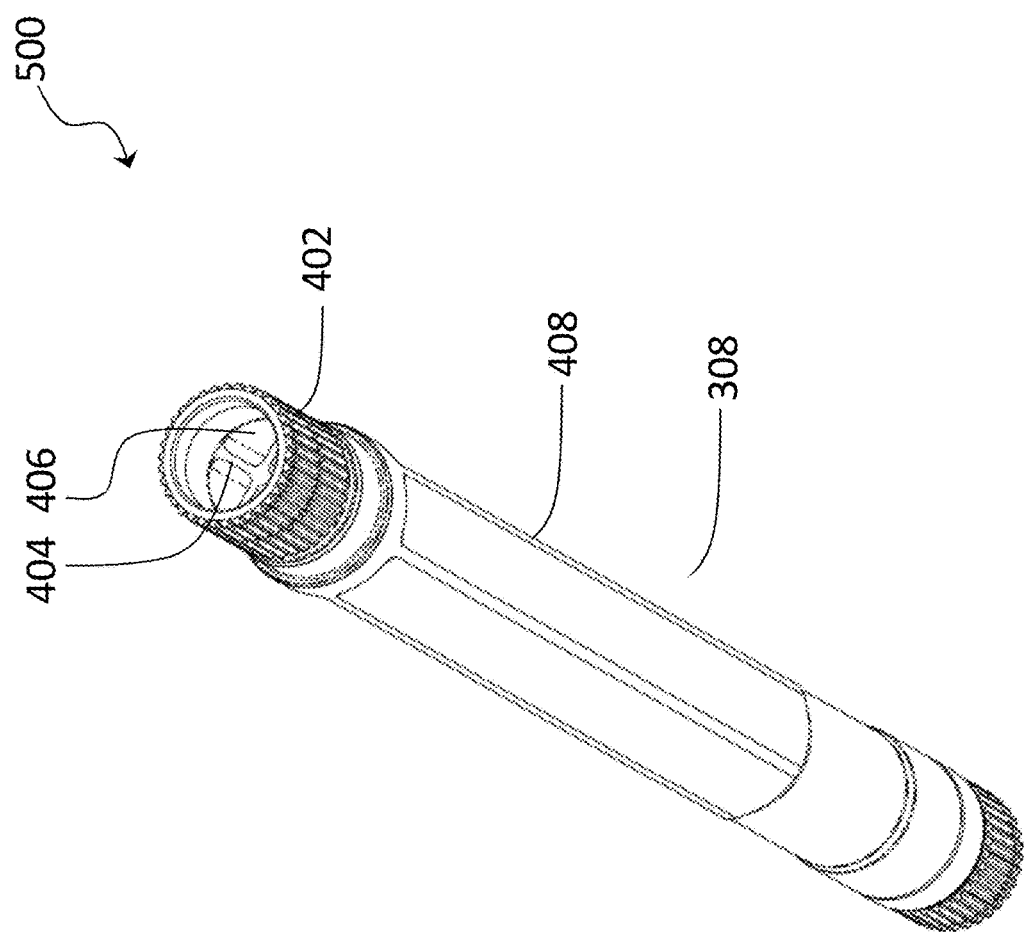
FIGS. 5A, D-F illustrate perspective views 500 of a driveshaft, according to some embodiments.
FIGS. 5B-C illustrate cross-sectional views 501 of a driveshaft, according to some embodiments.

Referring to FIGS. 4A, 5A and 5D, perspective views 400, 500 of a driveshaft 308 are shown, according to some embodiments. A tubular driveshaft 308 includes two or more interior channels 406 or openings. The channels 406 are positioned in a substantially longitudinal orientation. Two or more sprocket driving features 408 are, in at least some embodiments, positioned on an exterior surface of the tubular driveshaft 308, and one or more fitting components 402 (e.g., splines) are positioned at one or more distal ends of the driveshaft 308. In some embodiments, the sprocket driving features 408 are flats, splines, keyway(s), etc. In some embodiments, the driveshaft 308 has an epitrochoidal cross-section.

To reduce the weight of the component, the driveshaft 308 can be manufactured of a lightweight material, such as a non-ferrous metal, plastic, woven fabric, fiber-reinforced plastic, composite material, and combinations thereof. For example, the driveshaft 308 can be entirely composed of aluminum or plastic, or a composite material (e.g., formed from an epoxy resin and fibers such as carbon fiber, Kevlar, etc.), alloy (aluminum alloy), or any other suitable material. The driveshaft 308 can be formed of one piece construction, such as by extrusion, for example. The driveshaft 308 can also be formed by injection molding or additive manufacturing, sintering, or in any other suitable way. After extruding or injection molding, the driveshaft 308 can be hardened or hardening coats applied, for example.

Figure 4B:
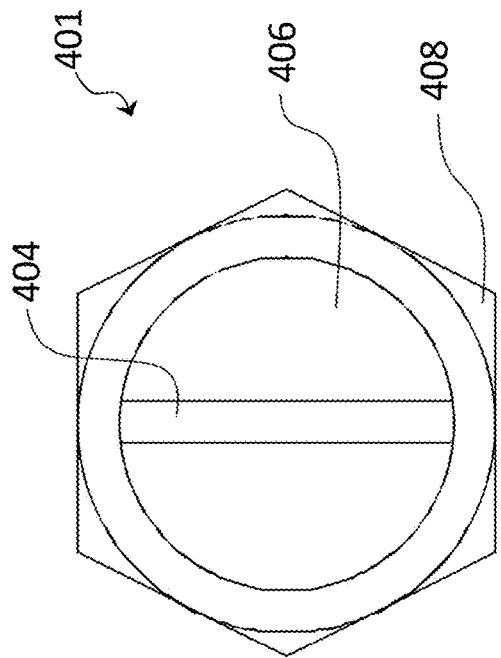
FIGS. 4B-E illustrate cross-sectional views 401 of a driveshaft, according to some embodiments.
Figure 4C:
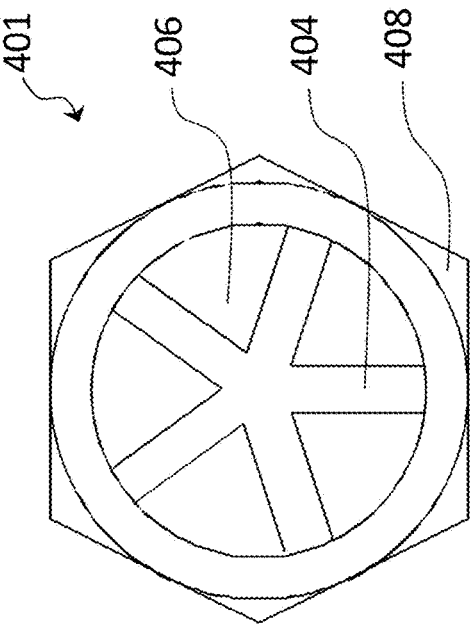
Figure 4D:
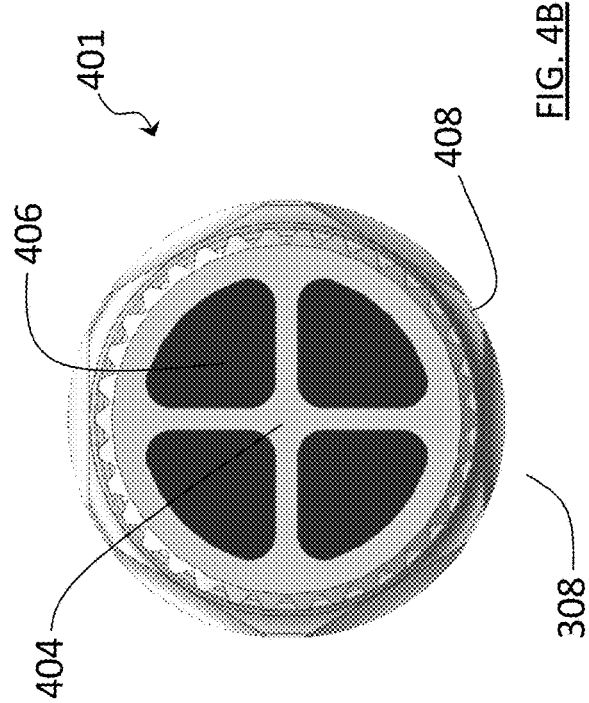
Figure 4E:
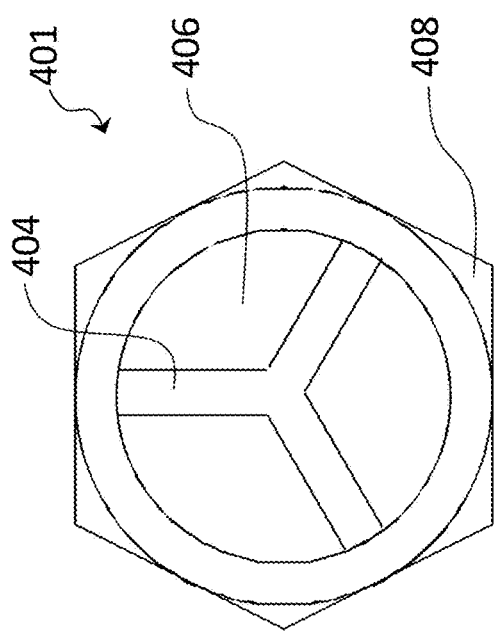

Some portion of the interior of the driveshaft 308 is hollow, such as by utilizing two or more interior channels 406 (see cross-sectional view 401 of FIG. 4B). The channels 406 are at least partially defined by one or more interior structural components 404. The channels 406 replace interior driveshaft material, thereby reducing overall weight and material cost. The structural components 404 provide enough torsional and bending strength for the driveshaft 308 to retain function and compare in performance to heavier steel or hybrid steel driveshafts used in the industry. The number of channels 406 can be two (see FIG. 4C), three (see FIG. 4D), four (FIG. 4B) or five or more (see FIG. 4E, for example). The channels 406 can be circular, triangular, rectangular, etc. or any shape that reduces weight of the driveshaft, while maintaining enough interior structural component 404 to provide acceptable component strength.

The channels 406 are generally positioned in a longitudinal orientation in relation to the tubular driveshaft 308. The channels 406 can comprise about 10% to about 50% hollow space within the tubular driveshaft. In further examples, the channels 406 can comprise about 5% to about 65%, about 20% to about 40%, or about 25% to about 35% hollow space within the tubular driveshaft. Depending on the manufacturing technique, the channels 406 can be generally continuous (see cross-sectional views 501 in FIGS. 5B-C) or can be positioned intermittently throughout the driveshaft 308.

The driveshaft 308 is in contact with sprockets 310, which in turn, are in contact with drive track 106. The driveshaft 308 includes sprocket driving features 408 to mate with an interior interface of the sprockets 310. For example, the driveshaft 308 can include six sprocket driving features 408, generally forming a hexagonal outer cross-section that mates with a hexagonal interior interface of sprockets 310. The number or shape of the sprocket driving features 408 can be three (triangular), four (rectangular), five (pentagonal), etc., so long as the exterior of the tubular driveshaft 308 is formed to fit with an interior surface or interface of one or more sprockets 310. FIGS. 6A-B show sprockets 310 in contact with the driveshaft 308 in perspective 600 and cross-sectional views 601. Further, it will be appreciated, that the sprocket driving features 408 could be any suitable feature such as splines, one or more keyways, involute or convolute shape, etc.

Figure 5E:
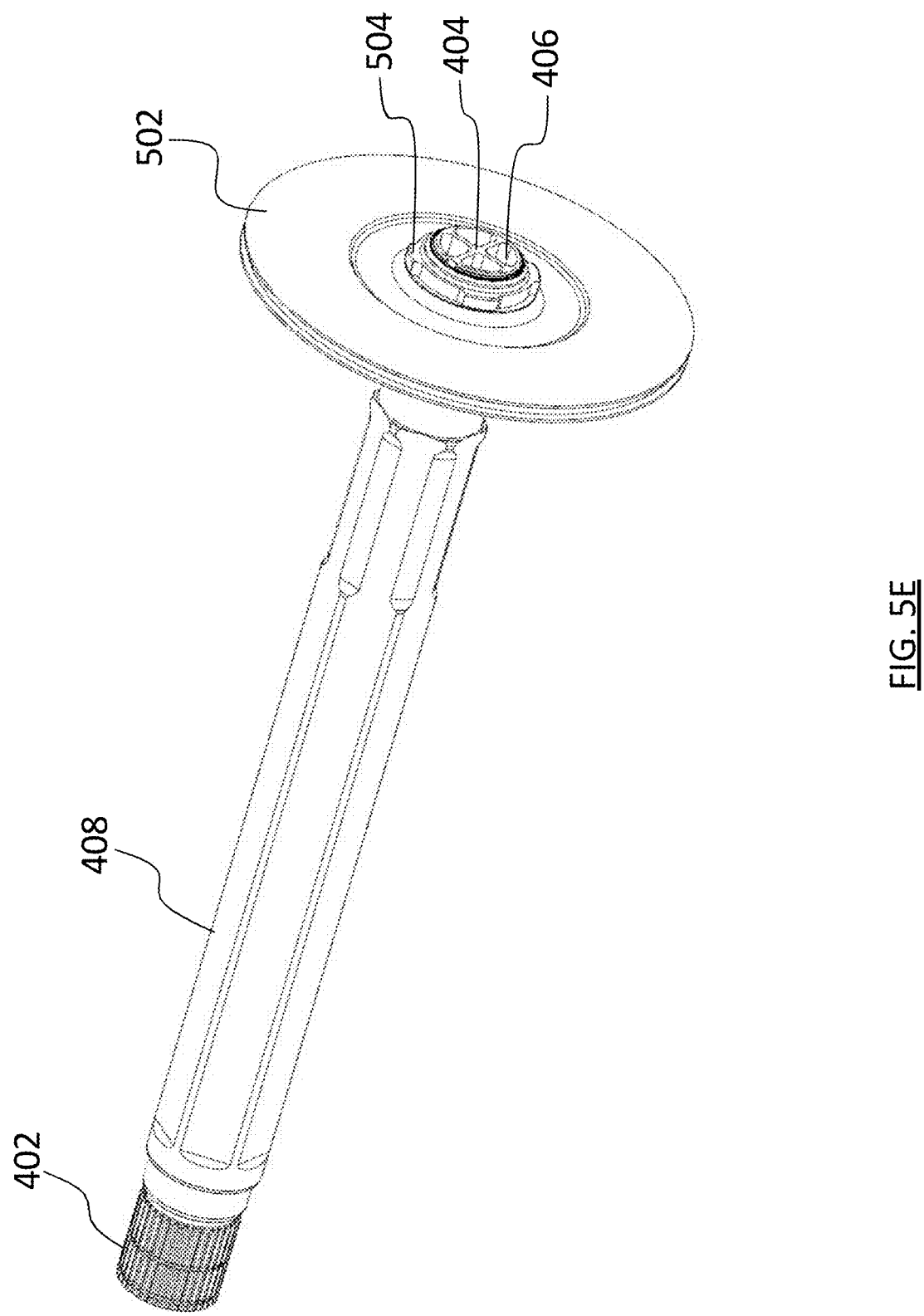
Figure 5F:
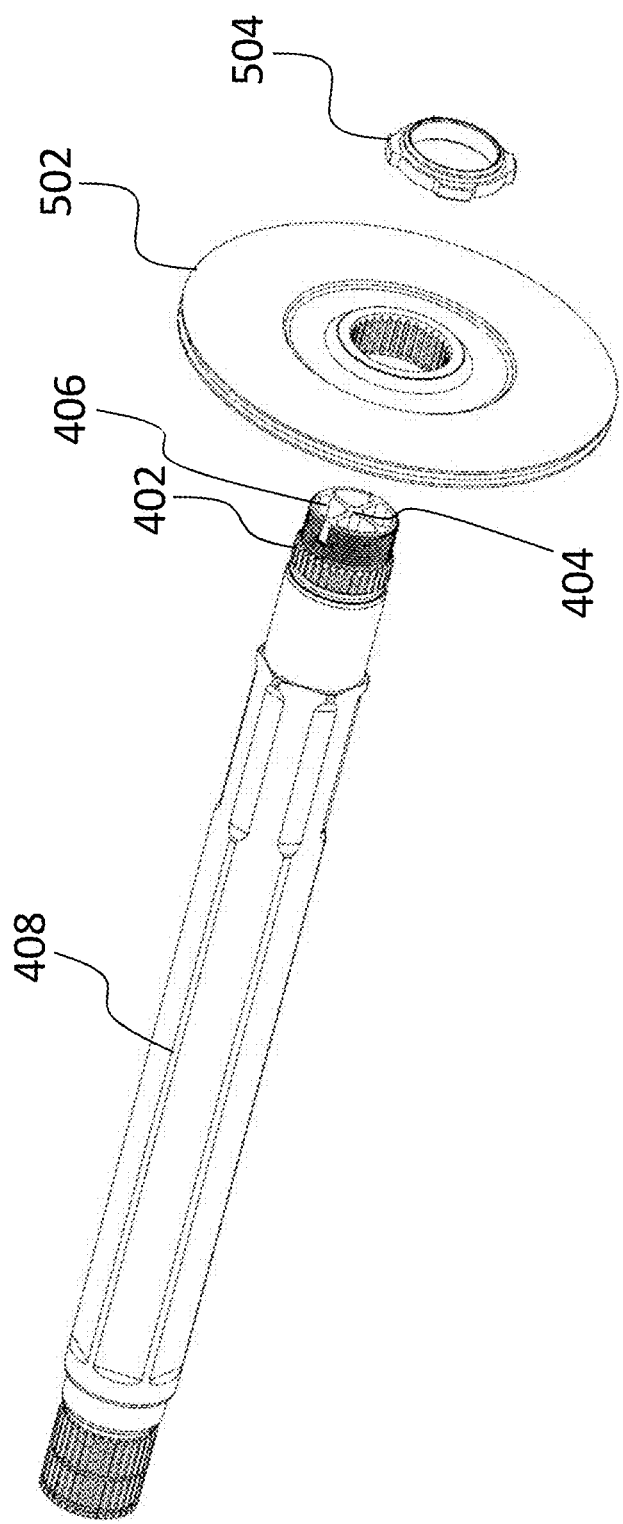
Figure 6D:
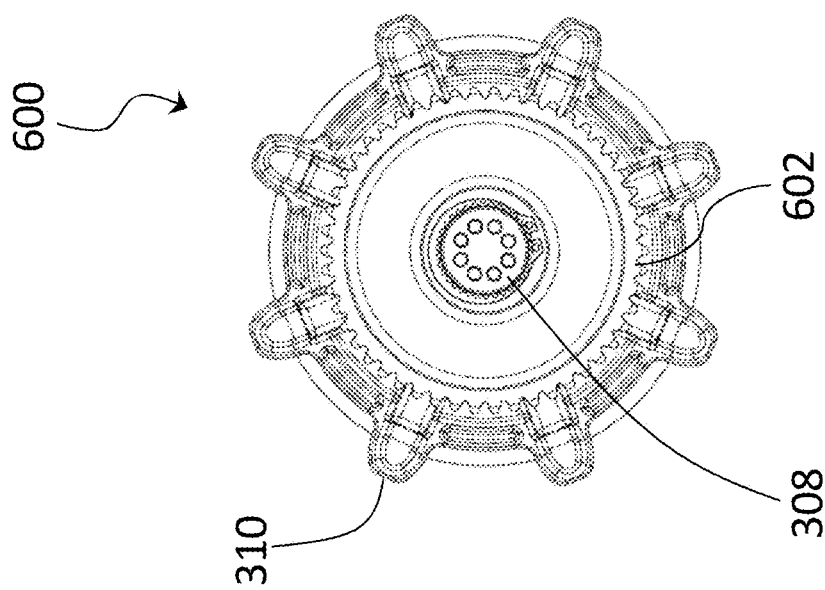
Figure 6C:
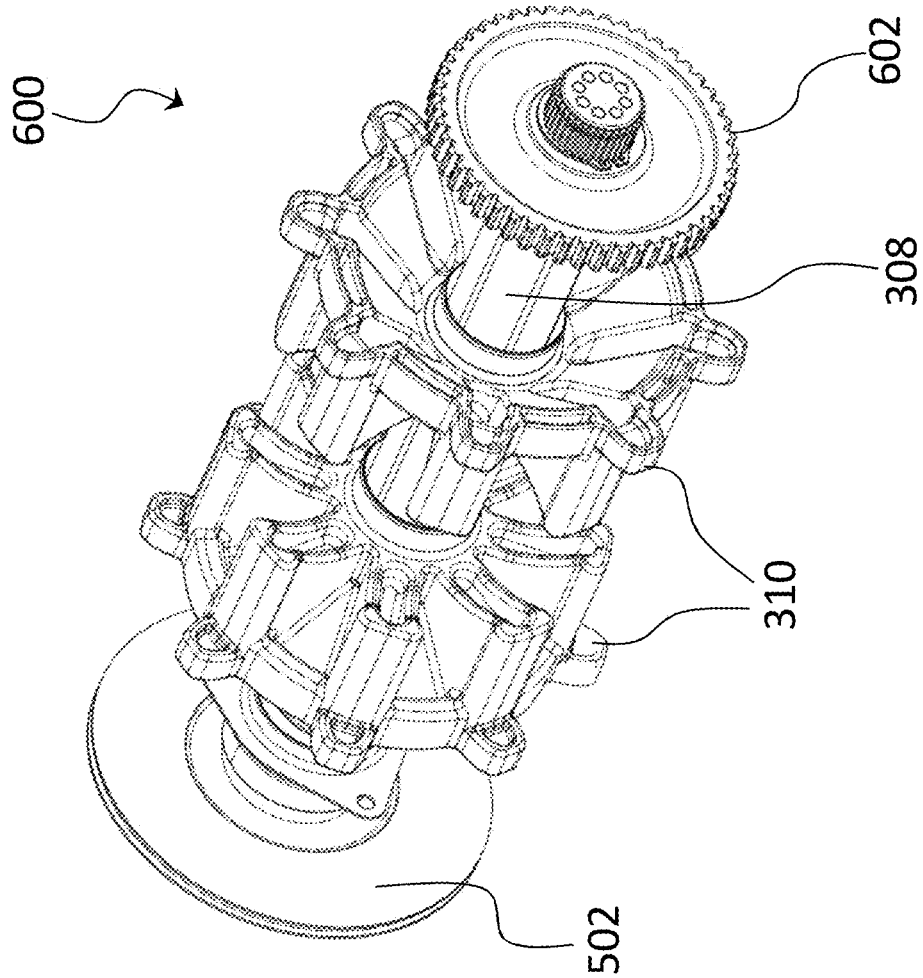

The distal fitting components 402 can be teeth, splines, or other mechanisms for interfacing with drive train 204 components. For example, in FIG. 5E, the driveshaft 308 is shown in contact with a brake disc 502, held in place by a nut 504 in contact with the fitting components 402 (see also exploded view in FIG. 5F). In FIGS. 6C-D, for example, a distal end of the driveshaft 308 is in contact with a gear 602 (from gear box/chain case 312) at the fitting component 402. Although discussed in the context of snowmobiles, the driveshaft 308 can be also used for all-terrain vehicles for driving either a front or rear differential, for example.

Figure 7G:
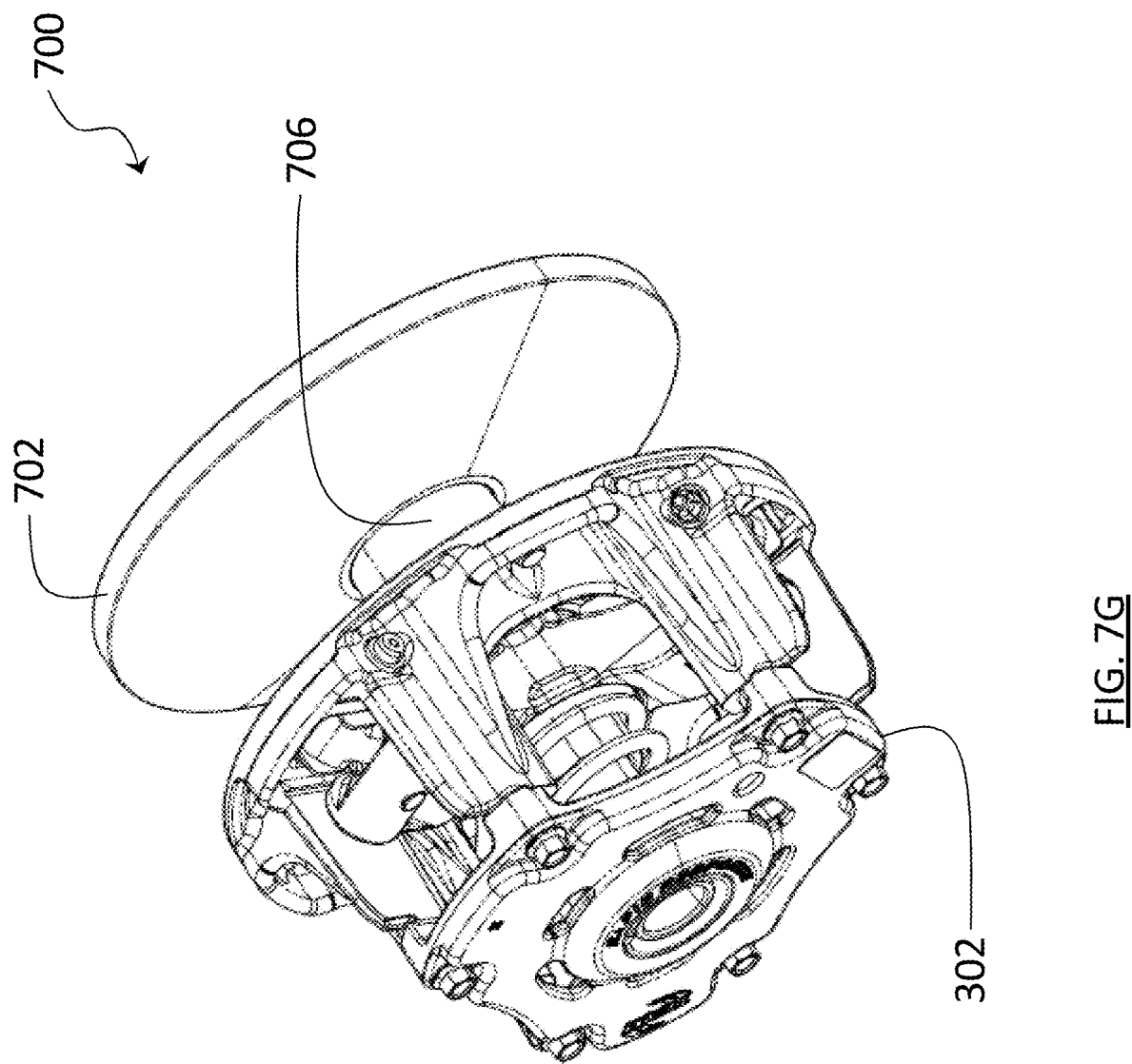
FIG. 7G illustrates a perspective view 700 of drive train components, according to some embodiments.

Referring to FIGS. 7E, 7F and 7G, perspective view 700 and cross-sectional view 701 of drive train 204 components are shown, according to some embodiments. In a typical setup, the primary drive clutch 302 has its sheaves normally biased apart (e.g., by a coil spring 710), so that when the engine is at idle speeds the drive belt 306 does not effectively engage the sheaves, thereby conveying essentially no driving force to the secondary driven clutch 304. As shown here, a two-way or multi-directional roller bearing 718 is positioned on the input shaft 706 (either directly or indirectly) and in contact with an interior surface of belt 306. The positioning of bearing 718 allows for the input shaft 706 to rotate while in idle without engaging the belt 306. The belt 306 now maintains tension, even in idle, and a user does not have to periodically monitor and manually adjust belt tension. Further, the belt 306 will now engage the sheaves 702, 704 at a lower position (closer to the input shaft 706) and in a lower powerband, accessing higher torque, lower speed applications.

Because the belt 306 is maintained at a higher tension (i.e., tighter) in idle, the neutral gap (gap between two sheaves when at idle state without belt) is larger and the sheaves move less to engage the belt 306. The belt gap (distance between the belt and each sheave) is also tighter, which contributes to more consistent belt 306 tension, better engagement out of idle and less movement needed by the sheaves to engage. The belt 306 can engage the sheaves at or below about 2800 engine RPMs. The belt can engage the sheaves at or below about 3200 RPMs for example.

Figure 8B:
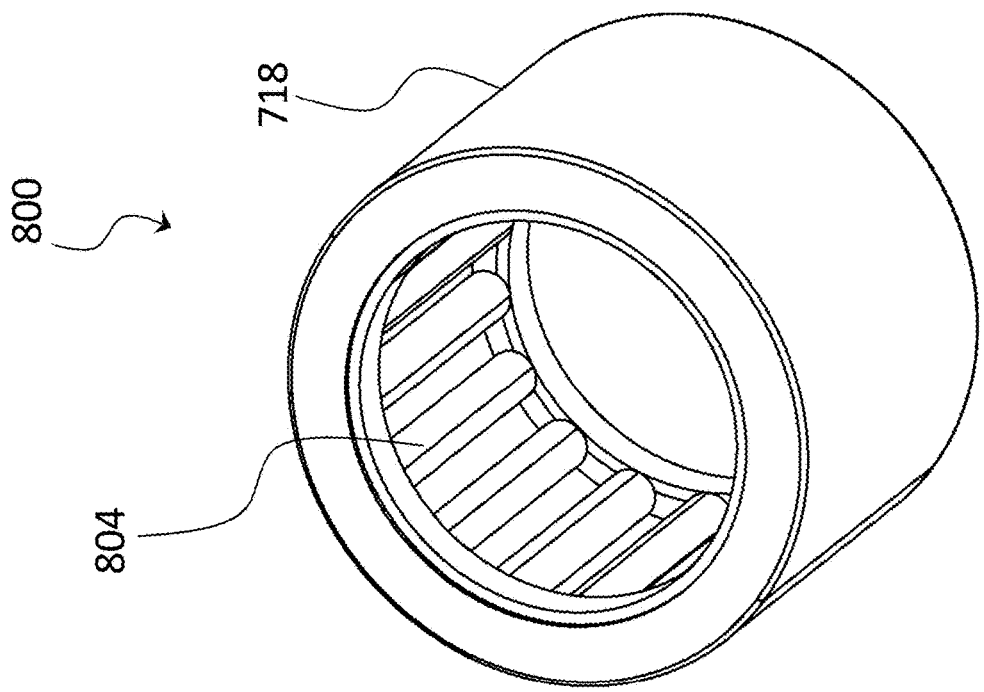
FIGS. 8A-B illustrate perspective views 800 of a roller bearing, according to some embodiments.
Figure 8A:
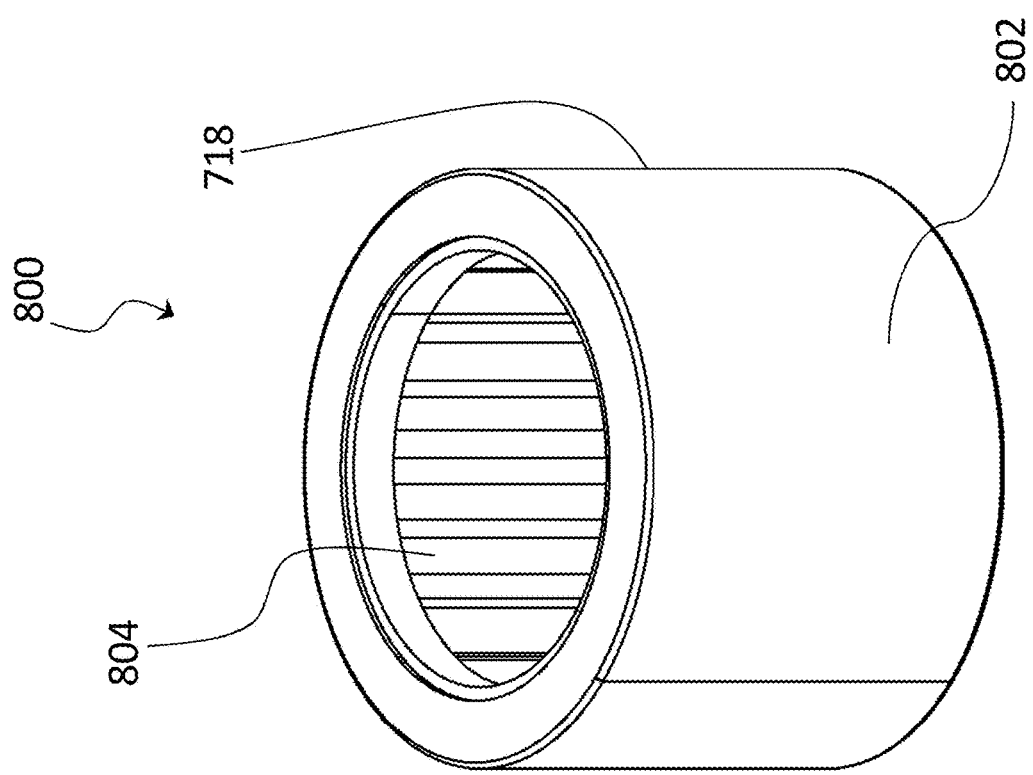

Referring to FIGS. 8A-B, perspective views 800 of a roller bearing 718 are shown, according to some embodiments. The roller bearing 718 includes an outer surface 802, which engages an inner surface of belt 306, and inner rollers 804. The bearing 718 can be a needle bearing, for example.

Figure 9:
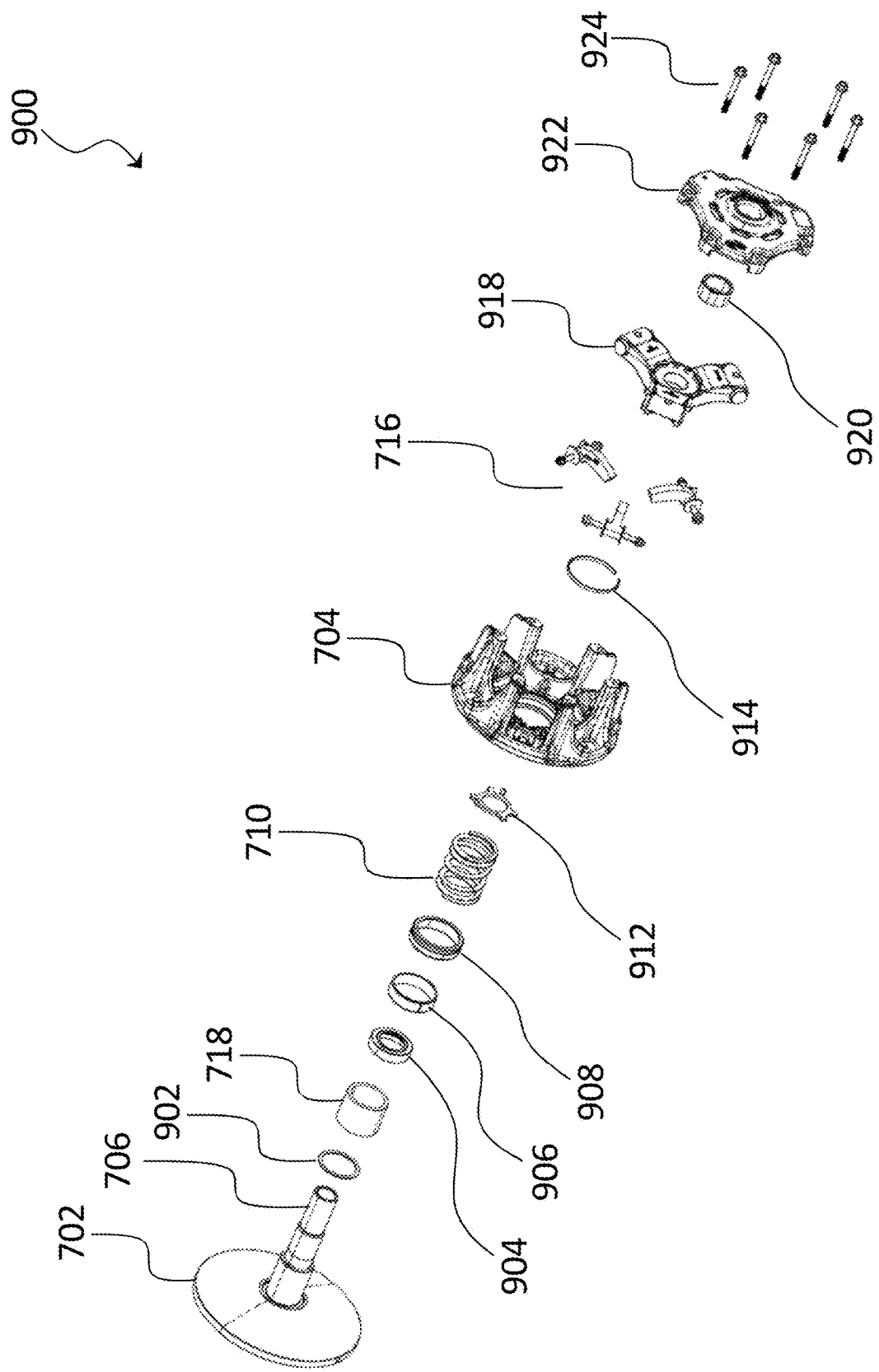
FIG. 9 illustrates an exploded view 900 of drive train components, according to some embodiments.

Referring to FIG. 9, an exploded view 900 of drive train 2004 components is shown, according to some embodiments. Specifically, the primary clutch 302 is shown in an exploded view, including the roller or idle bearing 718. The fixed sheave 702 is in contact with an input shaft 706. A washer 902 is optionally positioned over the shaft 706 and adjacent the roller bearing 718. The roller bearing 718 allows for a belt 306 to remain generally stationary while the input shaft 706 spins in an idle position. The moveable sheave 704 can include a cap 904, press fitted inside an interior opening of the sheave 704. A bushing 906 and threaded component 906 can also be positioned within an interior opening of the sheave 704. A biasing coil spring 710 and lock washer 912 are positioned between the sheaves 702, 704. A spider 918 and flyweights 716 are positioned on an exterior portion of the moveable sheave 704. A cap 920, washer 914 and cover 922 are secured to the sheave 704 via fasteners, such as bolts 924.

Figure 10A:
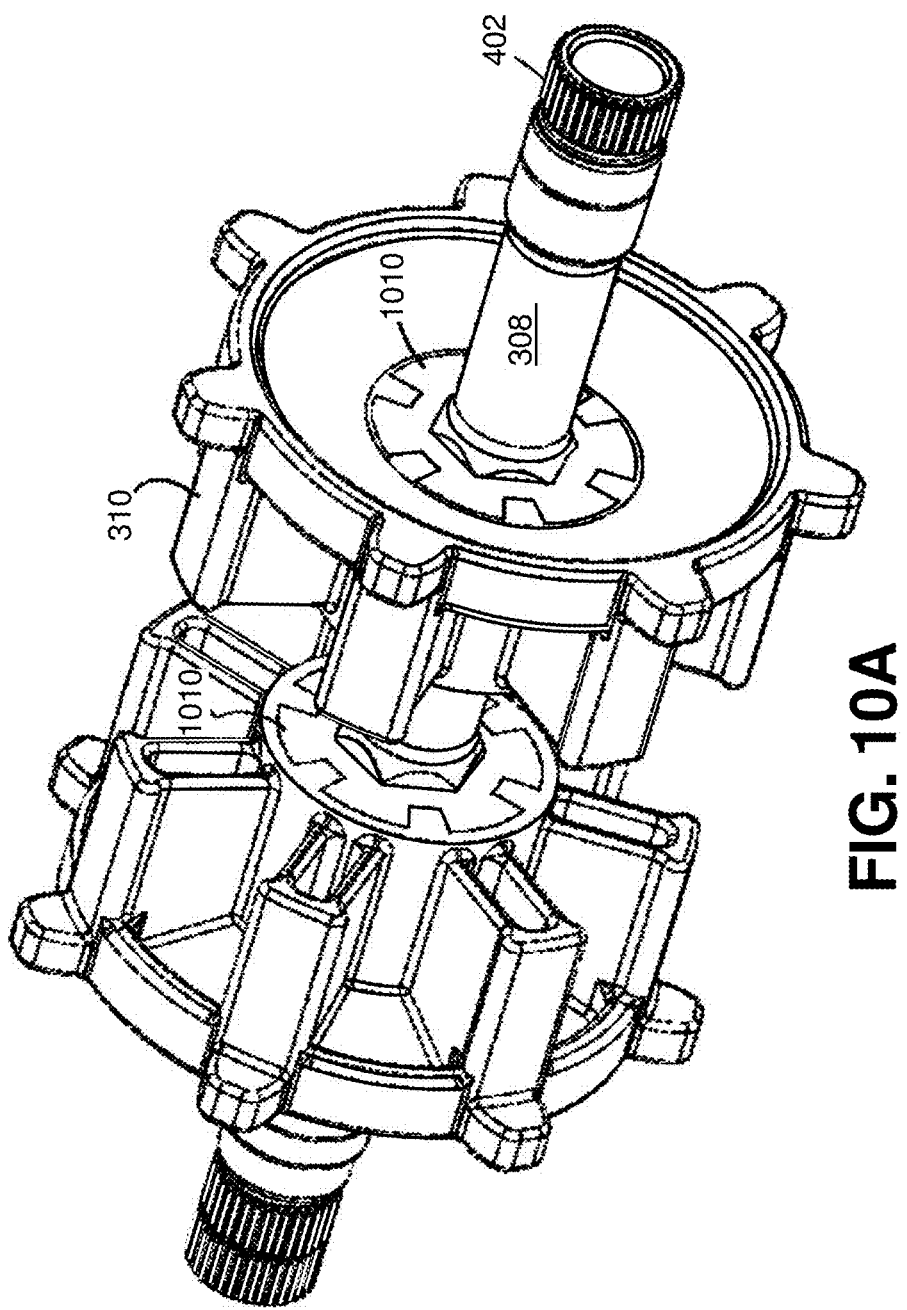
FIG. 10A illustrates a perspective view of drive train components, according to some embodiments.
Figure 10B:
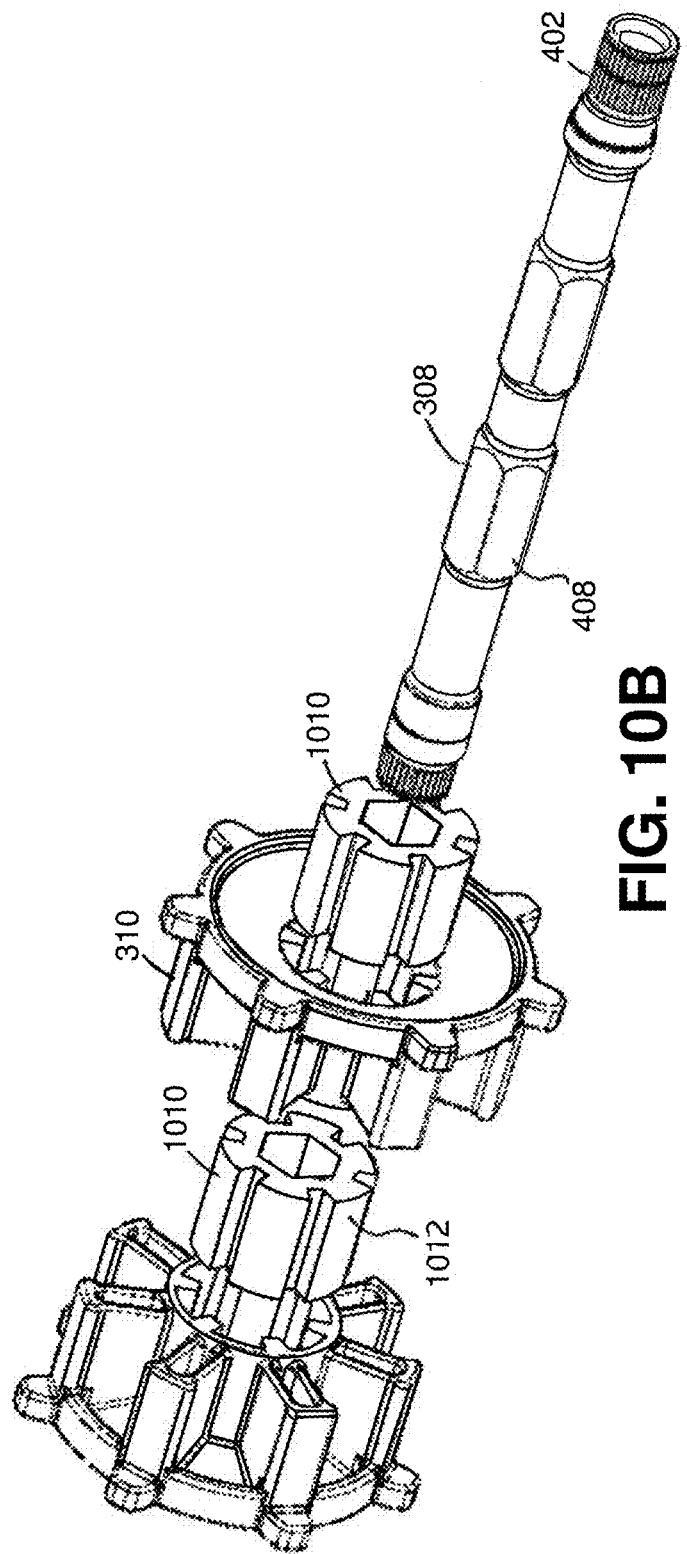
FIG. 10B illustrates an exploded perspective view of the drive train components of FIG. 10A, according to some embodiments.

With regard to FIGS. 10A and 10B, in some embodiments, the drive track and sprocket assembly includes one or more damping members 1010 formed from a polymeric or rubberized material. The damping member 1010 isolates vibration from being transferred from the engine 202, jack shaft 314, and gearbox 312 to the sprocket(s) 310. Further, the damping member 1010 isolates vibration from being transferred from the drive track 106 (FIG. 1) and sprocket(s) 310 to the drive shaft 308 and gearbox 312.

The damping member(s) 1010 reduce spike loads by absorbing the spike loads via the damping material forming the damping members 1010. In this way, the drive shaft 308 and, in some embodiments, the fitting components 402 (e.g., splines) can be formed from a lighter weight and/or softer material than hardened steel.

The damping member(s) 1010 can be formed form a component that is separate from the sprocket(s) 310 or it can be integrally molded with the sprocket(s) 310, for example using an overmolding process. In some embodiments, damping member(s) 1010 including radially projecting lugs 1012, however, any suitable form of engagement with the sprocket(s) 310 can be utilized. Further, in some embodiments, the damping member(s) 1010 fit over the sprocket driving features 408 (FIG. 10B), however, the drive shaft 308 can be drivingly coupled to the damping member(s) 1010 in any suitable way (e.g., radially extending projections, splines, etc.).

In some examples, the damping member(s) 1010 have a hardness between 45 and 100 Shore A. In some examples, the damping member(s) 1010 have a hardness between 50 and 60 Shore A; 60 and 70 Shore A; 70 and 80 Shore A; and 80 and 90 Shore A; 90 and 100 Shore A. In some examples, the damping member(s) 1010 have a hardness between 60 and 80 Shore A.

In some examples, the damping member(s) can comprise a hydraulic damper, viscous coupling, or biasing member (e.g., coil spring, torsion spring).

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A snowmobile, comprising:
an engine, mounted on a chassis;
a drive track, in contact with the chassis; and
a drive train, operatively interconnecting the engine with the drive track for delivering propulsive power to the drive track, the drive train including:
a rotatable input shaft connectable to an engine of a vehicle;
a rotatable drive clutch connected to the input shaft, the drive clutch having a stationary sheave with an inner belt-engaging surface, a movable sheave with an inner belt-engaging surface, and a two-way roller bearing carried on the input shaft, the roller bearing having an outer belt-engaging surface;
a rotatable jack shaft connectable to a gear box;
a rotatable driven clutch connected to the jack shaft, the driven clutch having a laterally stationary sheave with an inner belt-engaging surface;
a laterally movable sheave with an inner belt-engaging surface; and
an endless flexible drive belt disposed about the drive and driven clutches, the belt having an inner drive surface engageable with the outer surface of the roller bearing and a pair of side drive surfaces engageable against the inner belt-engaging surfaces of the sheaves, the size of the drive belt being selected so that when the engine is at an idle speed the inner surface of the belt firmly engages the outer surface of the roller bearing,
wherein the roller bearing is configured and arranged to permit the belt-engaging surface of the roller bearing to remain substantially stationary when the input shaft is rotating, thereby permitting the belt and driven clutch to remain substantially stationary when the engine is at an idle speed.

2. The snowmobile of claim 1, wherein the roller bearing includes inner rollers.

3. The snowmobile of claim 1, wherein the roller bearing is a needle bearing.

4. The snowmobile of claim 1, wherein the outer belt-engaging surface of the roller bearing is in contact with the inner drive surface of the endless flexible drive belt.

5. The snowmobile of claim 1, wherein the endless flexible drive belt maintains tension when the engine is at idle speed.

6. The snowmobile of claim 1 further including a washer positioned over the input shaft, wherein the washer is positioned adjacent to the roller bearing.

7. The snowmobile of claim 1 further including a driveshaft in contact with the gear box.

8. The snowmobile of claim 7, wherein the driveshaft is in contact with one or more sprockets.

9. The snowmobile of claim 8, wherein the sprockets are in contact with the drive track.

10. The snowmobile of claim 7, wherein the driveshaft includes two or more interior channels, the channels positioned in a substantially longitudinal orientation.

11. The snowmobile of claim 1, wherein the roller bearing allows the endless flexible drive belt to engage the sheaves at or below about 2800 RPM.

12. The snowmobile of claim 1, wherein the roller bearing allows the endless flexible drive belt to engage the sheaves at or below about 3200 RPM.

13. A snowmobile, comprising:
an engine, mounted on a chassis;
a drive track, in contact with the chassis; and
 a drive train, operatively interconnecting the engine with the drive track for delivering propulsive power to the drive track, the drive train including:
a rotatable input shaft connectable to an engine of a vehicle;
 a rotatable drive clutch connected to the input shaft, the drive clutch having a stationary sheave with an inner belt-engaging surface, a movable sheave with an inner belt-engaging surface, and a two-way roller bearing carried on the input shaft, the roller bearing having an outer belt-engaging surface;
a rotatable jack shaft connectable to a gear box;
 a driveshaft in contact with the gear box, wherein the driveshaft includes two or more interior channels, the channels positioned in a substantially longitudinal orientation;
 a rotatable driven clutch connected to the jack shaft, the driven clutch having a laterally stationary sheave with an inner belt-engaging surface;
a laterally movable sheave with an inner belt-engaging surface; and
an endless flexible drive belt disposed about the drive and driven clutches, the belt having an inner drive surface engageable with the outer surface of the roller bearing and a pair of side drive surfaces engageable against the inner belt-engaging surfaces of the sheaves, the size of the drive belt being selected so that when the engine is at an idle speed the inner surface of the belt firmly engages the outer surface of the roller bearing,
 wherein the roller bearing is configured and arranged to permit the belt-engaging surface of the roller bearing to remain substantially stationary when the input shaft is rotating, thereby permitting the belt and driven clutch to remain substantially stationary when the engine is at an idle speed.

14. The snowmobile of claim 13, wherein the roller bearing is a needle bearing.

15. The snowmobile of claim 13, wherein the outer belt-engaging surface of the roller bearing is in contact with the inner drive surface of the endless flexible drive belt.

16. The snowmobile of claim 13 further including a washer positioned over the input shaft, wherein the washer is positioned adjacent to the roller bearing.

17. The snowmobile of claim 13, wherein the driveshaft is in contact with one or more sprockets.

18. The snowmobile of claim 17, wherein the sprockets are in contact with the drive track.

19. The snowmobile of claim 13, wherein the roller bearing allows the endless flexible drive belt to engage the sheaves at or below about 2800 RPM.

20. The snowmobile of claim 13, wherein the roller bearing allows the endless flexible drive belt to engage the sheaves at or below about 3200 RPM.

* * * * *